(12) United States Patent
Koerber et al.

(10) Patent No.: US 10,750,163 B2
(45) Date of Patent: *Aug. 18, 2020

(54) AUTOSTEREOSCOPIC DISPLAY DEVICE AND DISPLAY METHOD

(71) Applicant: KONINKLIJKE PHILIPS N.V., Eindhoven (NL)

(72) Inventors: Achim Gerhard Rolf Koerber, Eindhoven (NL); Age Jochem Van Dalfsen, Eindhoven (NL); Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/682,246

(22) Filed: Nov. 13, 2019

(65) Prior Publication Data

US 2020/0084434 A1    Mar. 12, 2020

Related U.S. Application Data

(63) Continuation of application No. 15/776,093, filed as application No. PCT/EP2016/082723 on Dec. 27, 2016, now Pat. No. 10,506,222.

(30) Foreign Application Priority Data

Dec. 29, 2015 (EP) .................................... 15203021

(51) Int. Cl.
*H04N 13/00* (2018.01)
*H04N 13/368* (2018.01)
(Continued)

(52) U.S. Cl.
CPC ......... *H04N 13/368* (2018.05); *H04N 13/305* (2018.05); *H04N 13/32* (2018.05); *H04N 13/376* (2018.05); *H04N 13/383* (2018.05); *H04N 13/398* (2018.05); *H04N 2213/001* (2013.01)

(58) Field of Classification Search
USPC ................................................ 348/42–43, 59
See application file for complete search history.

(56) References Cited

U.S. PATENT DOCUMENTS

| 6,633,655 | B1 | 10/2003 | Hong |
| 7,425,069 | B2 | 9/2008 | Schwerdtner et al. |

(Continued)

FOREIGN PATENT DOCUMENTS

| WO | 2009104817 A1 | 8/2009 |
| WO | 2009147588 A1 | 12/2009 |

(Continued)

*Primary Examiner* — Nigar Chowdhury

(57) ABSTRACT

An autostereoscopic display includes a steerable display backlight, having a light output arrangement for providing lines of light output and a first lenticular lens array, with each lens focused near a corresponding line of light output. A display panel is illuminated by the backlight and a second lenticular array generates at least two views to different viewing directions. Head and/or eye tracking is used for tracking at least two viewers. Views are provided to the two eyes of a tracked viewer at the same time, and views are provided to the two eyes of different tracked viewers timesequentially.

20 Claims, 17 Drawing Sheets

(51) Int. Cl.
*H04N 13/305* (2018.01)
*H04N 13/32* (2018.01)
*H04N 13/376* (2018.01)
*H04N 13/383* (2018.01)
*H04N 13/398* (2018.01)

(56) References Cited

U.S. PATENT DOCUMENTS

| | | |
|---|---|---|
| 7,450,188 B2 | 11/2008 | Schwerdtner |
| 7,978,407 B1 | 7/2011 | Connor |
| 8,134,590 B2 | 3/2012 | De Zwart et al. |
| 8,587,641 B2 | 11/2013 | Roth |
| 10,283,056 B2 | 5/2019 | Kim |
| 2002/0075384 A1 | 6/2002 | Harman |
| 2005/0117016 A1 | 6/2005 | Surman |
| 2005/0185711 A1 | 8/2005 | Pfister |
| 2006/0279567 A1 | 12/2006 | Schwerdtner et al. |
| 2010/0259604 A1 | 10/2010 | Surman |
| 2011/0310232 A1 | 12/2011 | Wilson et al. |
| 2012/0113209 A1* | 5/2012 | Ritchey ............ G02B 27/0172 348/14.02 |
| 2012/0162204 A1* | 6/2012 | Vesely ................ H04N 13/366 345/419 |
| 2012/0176473 A1 | 7/2012 | Genova |
| 2013/0050452 A1 | 2/2013 | Ramsey |
| 2013/0057159 A1 | 3/2013 | Pijlman |
| 2016/0062121 A1* | 3/2016 | Border ............... G02B 27/017 359/630 |
| 2016/0116979 A1* | 4/2016 | Border ............. G02B 27/0093 345/156 |
| 2016/0131912 A1* | 5/2016 | Border ............. G02B 27/0018 345/8 |
| 2016/0246055 A1* | 8/2016 | Border .................. G06F 3/005 |
| 2016/0292917 A1* | 10/2016 | Dorner .................. G02B 27/01 |

FOREIGN PATENT DOCUMENTS

| | | |
|---|---|---|
| WO | 2010136921 A2 | 12/2010 |
| WO | 2011145031 A2 | 11/2011 |
| WO | 2013144773 A2 | 10/2013 |
| WO | 2013160803 A1 | 10/2013 |

* cited by examiner

AUTOSTEREOSCOPIC DISPLAY DEVICE AND DISPLAY METHOD

CROSS-REFERENCES TO RELATED APPLICATIONS

This application is a continuation of U.S. patent application Ser. No. 15/776,093, filed on 27 Dec. 2018, which is the U.S. National Phase application under 35 U.S.C. § 371 of International Application No. PCT/EP2016/082723, filed on Dec. 27, 2016, which claims the benefit of European Patent Application No. EP 15203021.9, filed on Dec. 29, 2015. These applications are hereby incorporated by reference herein.

FIELD OF THE INVENTION

This invention relates to an autostereoscopic display device and a display method.

BACKGROUND OF THE INVENTION

A known autostereoscopic display device comprises a two-dimensional liquid crystal display panel having a row and column array of display pixels (wherein a "pixel" typically comprises a set of "sub-pixels", and a "sub-pixel" is the smallest individually addressable, single-color, picture element) acting as an image forming means to produce a display. An array of elongated lenses extending parallel to one another overlies the display pixel array and acts as a view forming means. These are known as "lenticular lenses". Outputs from the display pixels are projected through these lenticular lenses, which function to modify the directions of the outputs.

The lenticular lenses are provided as a sheet of lens elements, each of which comprises an elongate part-cylindrical lens element. The lenticular lenses extend in the column direction of the display panel, with each lenticular lens overlying a respective group of two or more adjacent columns of display sub-pixels.

Each lenticular lens can be associated with two columns of display sub-pixels to enable a user to observe a single stereoscopic image. Instead, each lenticular lens can be associated with a group of three or more adjacent display sub-pixels in the row direction. Corresponding columns of display sub-pixels in each group are arranged appropriately to provide a vertical slice from a respective two dimensional sub-image. As a user's head is moved from left to right a series of successive, different, stereoscopic views are observed creating, for example, a look-around impression.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of rows and columns of display sub-pixels 5. For the sake of clarity, only a small number of display sub-pixels 5 are shown in the Figure. In practice, the display panel 3 might e.g. comprise about two thousand rows and four thousand columns of display sub-pixels 5. In the future this might even become much more. In a black and white display panel a sub-pixel in fact constitutes a full pixel. In a color display a sub-pixel is one color component of a full color pixel. The full color pixel, according to general terminology comprises all sub-pixels necessary for creating all colors of a smallest image part displayed. Thus, e.g. a full color pixel may have red (R) green (G) and blue (B) sub-pixels possibly augmented with a white sub-pixel or with one or more other elementary colored sub-pixels. The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display sub-pixel 5 comprises opposing electrodes on the substrates, with the intervening liquid crystal material there between. The shape and layout of the display sub-pixels 5 are determined by the shape and layout of the electrodes. The display sub-pixels 5 are regularly spaced from one another by gaps.

Each display sub-pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display sub-pixels 5 being driven to modulate the light and produce the display. The backlight 7 has side edges 7a and 7b, a top edge 7c and a bottom edge 7d. It has a front face from which light is output. The display device 1 also comprises a lenticular sheet 9, arranged over the display side of the display panel 3, which performs a light directing function and thus a view forming function. The lenticular sheet 9 comprises a row of lenticular elements 11 extending parallel to one another, of which only one is shown with exaggerated dimensions for the sake of clarity.

The lenticular elements 11 are in the form of convex (part-) cylindrical lenses each having an elongate axis 12 extending perpendicular to the cylindrical curvature of the element, and each element acts as a light output directing means to provide different images, or views, from the display panel 3 to the eyes of a user positioned in front of the display device 1.

The display device has a controller 13 which controls the backlight and the display panel.

The autostereoscopic display device 1 shown in FIG. 1 is capable of providing several different perspective views in different directions, i.e. it is able to direct the pixel output to different spatial positions within the field of view of the display device. In particular, each lenticular element 11 overlies a small group of display sub-pixels 5 in each row, where, in the current example, a row extends perpendicular to the elongate axis of the lenticular element 11. The lenticular element 11 projects the output of each display sub-pixel 5 of a group in a different direction, so as to form the several different views. As the user's head moves from left to right, his/her eyes will receive different ones of the several views, in turn.

FIG. 2 shows the principle of operation of a lenticular type imaging arrangement as described above in more detail and shows the backlight 20, the display device 24, the liquid crystal display panel and the lenticular array 28 in cross section. FIG. 2 shows how the lenticular 27 of the lenticular arrangement 28 directs the outputs of the pixels 26', 26" and 26''' of a group of pixels to the respective three different spatial locations 22', 22" and 22'" in front of the display device. The different locations 22', 22" and 22'" are part of three different views.

In a similar manner, the same output of display pixels 26', 26" and 26'" is directed into the respective three other different spatial locations 25', 25" and 25'" by the lenticular 27' of the arrangement 28. While the three spatial positions 22' to 22'" define a first viewing zone or cone 29', the three spatial positions 25' to 25'" define a second viewing cone 29". It will be appreciated that more of such cones exist (not shown) depending on the number of lenticular lenses of the array that can direct the output of a group of pixels such as formed by the pixels 26' to 26'". The cones fill the entire field of view of the display device.

FIG. 2 is only schematic. The adjacent cones 29' and 29" result from rays intersecting adjacent lens surfaces at corresponding positions, not shown in schematic FIG. 2.

The above view directing principle leads to view repetition occurring upon going from one viewing cone to another as within every cone the same pixel output is displayed in a particular view. Thus, in the example of FIG. 2, spatial positions 22" and 25" provide the same view, but in different viewing cones 29' and 29" respectively. In other words, a particular view shows the same content in all viewing cones. At the boundaries between viewing cones, there is a jump between extreme views, so that the autostereoscopic effect is disrupted.

A solution to this problem is to allow only a single viewing cone, for example by designing the backlight to have a directional output. WO 2011/145031 discloses various approaches for defining a display with a single cone output.

The use of a collimated backlight for controlling the direction from which a view can be seen is for example known for several different applications, including for gaze tracking applications, privacy panels and enhanced brightness panels. One known component of such a collimated backlight is a light generating component which extracts all of its light in the form of an array of thin light emitting stripes spaced at around the pitch of a lenticular lens that is also part of the backlight.

This configuration is shown in FIG. 3 in which the backlight 7 comprises an array 30 of striped light emitters, a positive lens array 32 and a replica structure 34 between the lens array and the emitters. The lens array 32 collimates the light coming from the array 30 of thin light emitting stripes. Such a backlight can be formed from a series of emissive elements, such as lines of LEDs or OLED stripes.

It is very challenging to provide correct images for the left and right eyes of every viewer so that a stereoscopic viewing experience is created for a wide range of viewing angles and viewing distances.

The generation of a large number N of views as repeating "fans" in the horizontal direction as explained above, by using a (slanted) lenticular array in front of the display, provides one solution. However, a well-known disadvantage of this solution is that the 3D mode spatial resolution is strongly reduced—commonly by a factor of the square root of N in each direction. Furthermore, the stereoscopic experience is lost for a viewer at the transition edge between adjacent fans of views. Hence, there are diamond-shaped viewing zones that are determined by the cone angle and screen width of the display and viewers have to find a good place to sit and are not able to move much without reducing their 3D experience.

Multi-view and especially fractional view displays provide a smooth motion parallax and smooth cone transitions, but at the cost of rendering many views (e.g. 10, 20, etc.). Often a low amount such as one or two inputs views is available and multiple synthetic views are generated. In a fractional view display the well-known problem of appearance of dark bands caused by the black mask around the sub-pixels is eliminated or at least reduced by dimensioning a lenticular lens array such that the relative position of the sub-pixels and lens axes results in multiple (k) sub-phases. This suppresses the lower spatial frequencies of the banding by averaging over the k partial view points. In addition the extra view points allow for smooth motion parallax and fine-grained viewer adjustments. Such a fractional view display is disclosed in U.S. Pat. No. 8,134,590 and its contents is hereby included by reference, especially the part from column 1, line 45 to column 2 line 6.

Alternatively, a computer graphics method (e.g. OpenGL) is used to render views. In this way, conventional autostereoscopic displays generate much more information than needed for providing the stereo images for the left and right eyes of every viewer.

This problem is partially solved in so-called "stereo on multiview" displays with eye and/or head tracking, where only two views are rendered in alignment with the position of a single viewer, such that the viewer perceives a stereoscopic effect according to the two views. Thus the cost of generating the views is reduced because only two views are generated, or entirely removed when two input views are readily available. The problem with these devices is that they are only suitable for a single user, because any other non-tracked user would typically see a distorted image.

SUMMARY OF THE INVENTION

The invention is defined by the claims

According to an example, there is provided an autostereoscopic display comprising:

a steerable display backlight, comprising a light output arrangement for providing lines of light output and a first lenticular lens array;

a display panel having an array of display sub-pixels for producing a display image, the display illuminated by the backlight;

a second lenticular lens array for generating at least two views to different viewing directions;

a head and/or eye tracking system for tracking at least two viewers; and a controller for controlling the display panel and the steerable display backlight, wherein the controller is adapted to provide views to the two eyes of a tracked viewer at the same time, and to provide views to the two eyes of different tracked viewers time-sequentially.

The autostereoscopic display can be high resolution by providing a small number of views (as a result of the head/eye tracking). It enables a multi-user and dead-zone free display. Each viewer is individually addressed via a light steering backlight that is directing light to only one face at a time. The views to each individual viewer may be provided with a small viewing cone to provide optimum images for the left and right eyes of each viewer. However, the backlight output does not need to be so narrow that it reaches only one eye of a viewer. Instead, the backlight output is sufficiently wide to cover both eyes of a viewer (at the intended viewing distance) but not so wide as to cover multiple viewers. The mean inter-ocular distance for the general population is 63 mm, whereas when viewers sit next to each other, the distance between the nearest eyes of the two viewers is typically at least 500 mm. Thus, the cone width of the display at the intended viewing distance is for example in the range 100 mm to 500 mm, for example 100 mm to 300 mm, for example 100 mm to 150 mm.

The at least two views for each viewer are based on spatial multiplexing whereas the views for different viewers are based on temporal multiplexing.

Each lenticular lens of the backlight preferably has a focus at or near a corresponding line of light output, for example the focal distance is equal to 0.7 to 1.3 times the distance between the backlight lenticular lens and the lines of light output.

In one implementation, the controller is adapted to provide views to the two eyes of a tracked viewer by assigning the input views per sub-pixel according to the estimated visibility of each sub-pixel for the left and right eye of the viewer. The visibility is estimated based on an estimate of the position of the viewer with respect to the display. The visibility relates to the extent to which a particular sub-pixel is projected by a lens of the second lenticular array towards a particular viewing location.

A small number of views reduces the image processing requirements. It has also been found that using at least 4 static views is sufficient to hide the transition between views, as a user moves laterally. This works because each eye of the user is in one or between two adjacent views and those two views are then assigned to the same input view.

It is instead possible to generate to only two dynamic views for the display. In this case, a shifting arrangement may be provided for (electro-optical, mechanical or otherwise) shifting the second lenticular lens (the one that generates the multiple views) relative to the display. The controller is then adapted to provide views to the two eyes of a tracked viewer which are selected from the only two possible views, and the controller is adapted to control the shifting of the second lenticular relative to the display.

The steerable display backlight may have an output beam which has an angular spread of less than $\tan^{-1}(5\ IOD/vd)$ where IOD is the inter-ocular distance and vd is the intended viewer distance from the display. This means the width of the output beam at the intended viewer distance is less than 5 times the inter-ocular distance. This avoids adjacent viewers being displayed the same images. The output beam may have an angular spread of between $\tan^{-1}(1.5\ IOD/vd)$ and $\tan^{-1}(3\ IOD/vd)$, for example $\tan^{-1}(2\ IOD/vd)$.

The head and/or eye tracking system may be for locating the distance to the viewer and the lateral position of the viewer with respect to the display panel.

A diffuser may be provided on one side of the display panel. This reduces intensity modulations.

Examples in accordance with another aspect provide an autostereoscopic display method comprising:

tracking at least two viewers of the display;

providing lines of backlight light output in dependence on the tracked viewer locations;

directing the lines of backlight output through a first lenticular lens array to provide directional control;

illuminating a display panel comprising an array of display sub-pixels using the directionally controlled backlight light output to produce a display image;

generating at least two views to different viewing directions using a second lenticular lens array, wherein views are provided to the two eyes of a tracked viewer at the same time, and views are provided to the two eyes of the different tracked viewers time-sequentially.

This provides the display of autostereoscopic images to one viewer at a time, but with simultaneous display to the two eyes of each viewer.

The method may comprise assigning the input views to a number of views of at least 4 and/or less than 10, for example less than 8. The input views are then assigned per sub-pixel according to an estimated visibility of each sub-pixel for the left and right eye of the viewer.

Alternatively, the method may comprise generating two views and providing the two views to the two eyes of a tracked viewer, wherein the method further comprises shifting the second lenticular lens array relative to the display.

A backlight output beam may be provided which has an angular spread of less than $\tan^{-1}(5\ IOD/vd)$ where IOD is the inter-ocular distance and vd is the intended viewer distance from the display.

BRIEF DESCRIPTION OF THE DRAWINGS

Embodiments of the invention will now be described, purely by way of example, with reference to the accompanying drawings, in which:

FIG. 16 shows the angular intensity of the backlight with all light stripes on;

DETAILED DESCRIPTION OF THE EMBODIMENTS

The invention provides an autostereoscopic display which comprises a steerable display backlight having a light output arrangement for providing lines of light output and a first lenticular lens array, with each lens focused near a corresponding line of light output. A display panel is illuminated by the backlight and a second lenticular array generates at least two views to different viewing directions. Head and/or eye tracking is used for tracking one or more viewers of the display. Views are provided to the two eyes of a tracked viewer at the same time, and, in case of more than one viewer, views are provided to the two eyes of different tracked viewers time-sequentially. The number of necessary views can be reduced when there is the ability to move the views using optics (in addition to backlight steering).

The invention enables a reduction in image processing by enabling fewer views than for a standard multi-viewer multiple cone display, but it also enables operation for multiple viewers.

Figure 4:
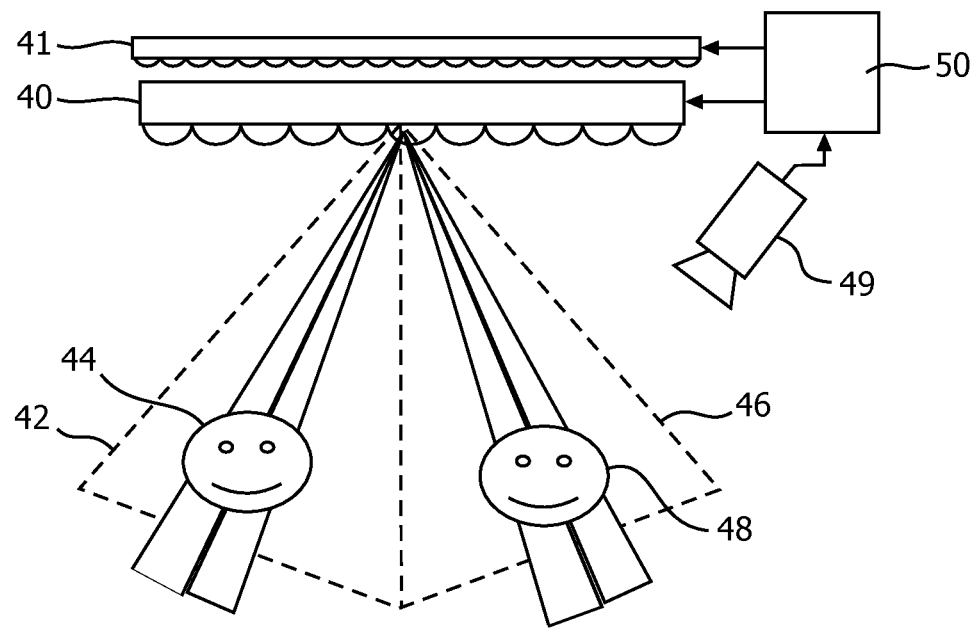
FIG. 4 shows the approach of this invention in simple schematic form.

FIG. 4 shows the approach in simple schematic form. The display comprises a light modulating display panel 40 such as an LCD panel and a light steering backlight 41. The display provides a first sub-frame 42 directed to a first viewer 44 and a second sub-frame 46 directed to a second viewer 48. Within each sub-frame views are provided simultaneously to the two eyes of the viewer. The system can be implemented using standard components and does not require the production of a narrow beam in the backlight. This makes the system practical to implement.

The system makes use of detection of viewer locations, in particular the horizontal viewing angle and preferably also the distance to the viewer via eye/head tracking by head tracking unit 49. A light steering backlight is used to direct the sub-frames into the desired direction. In one example, the light steering backlight comprises light emanating stripes near the focal plane of a lenticular lens array. The relative position of the stripes and an associated lens dictates the direction in which the stripe-shaped beam is output from the backlight. Thus by selecting the light emitting stripes to illuminate, directional control is possible.

A 3D lenticular display panel 40 with a second lenticular lens array is used to create the multiple images (two of which images are combined by the viewer to perceive a stereoscopic image) with a small viewing cone. The width of the viewing cone at the intended location of the viewer is for example about twice the intraocular distance (IOD) to provide optimum stereo images for the left and right eyes of each viewer.

The function of the backlight 41 is to illuminate each viewer one by one, making use of the head and/or eye tracking unit 49. The display panel 40 then provides stereoscopic vision to a single viewer.

A control unit 50 calculates the viewpoint of each eye of each viewer. The backlight stripes to be actuated in each sub-frame are selected and views are assigned to the display panel 40. The display has least crosstalk when the viewing cone is quite narrow, and preferably the half cone angle should correspond to the angle formed by the intraocular distance and the viewing distance.

Figure 5:
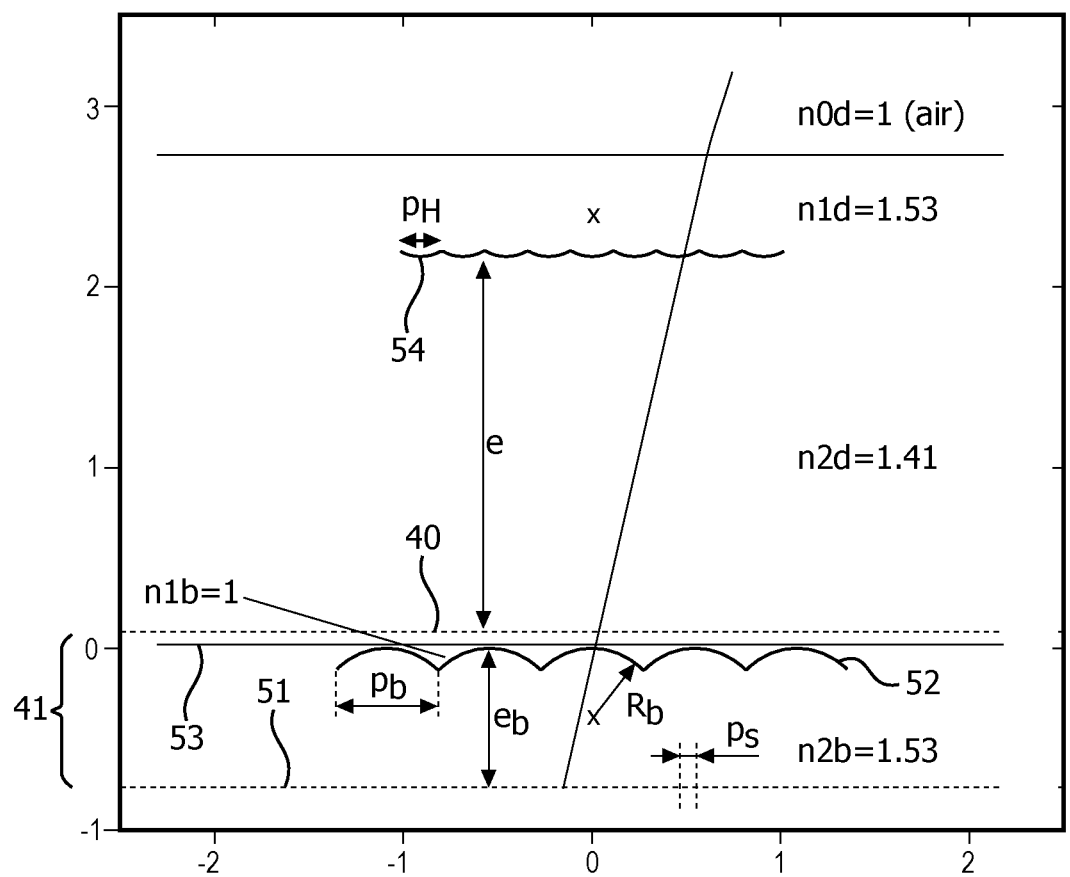
FIG. 5 shows the optical components in more detail.

FIG. 5 shows the optical components in more detail.

The backlight 41 comprises an array of illuminating stripes 51, with the stripes extending in the display column (i.e. vertical) direction. The backlight is provided with a first lenticular array 52, which also comprises elongate lenses which extend in the column direction. A diffuser 53 is shown over the backlight lens array 52 and may be considered to be part of the backlight 41. This diffuser is optional, and it may in fact be behind or in front of the display panel (so it may instead be considered to be part of the display panel). It spreads out the backlight views to reduce intensity modulations. The diffuser can spread wider than the intensity profile of a view (or even full cone) of the display.

The focal plane of the lens array 52 is preferably at the light emitting stripes 51. More generally, the lenticular lenses of the backlight preferably have a focus at or near a corresponding line of light output, for example the focal distance is equal to 0.7 to 1.3 times the distance between the backlight lenticular lens and the lines of light output.

The display panel 40 is provided over the backlight 41.

Figure 1:
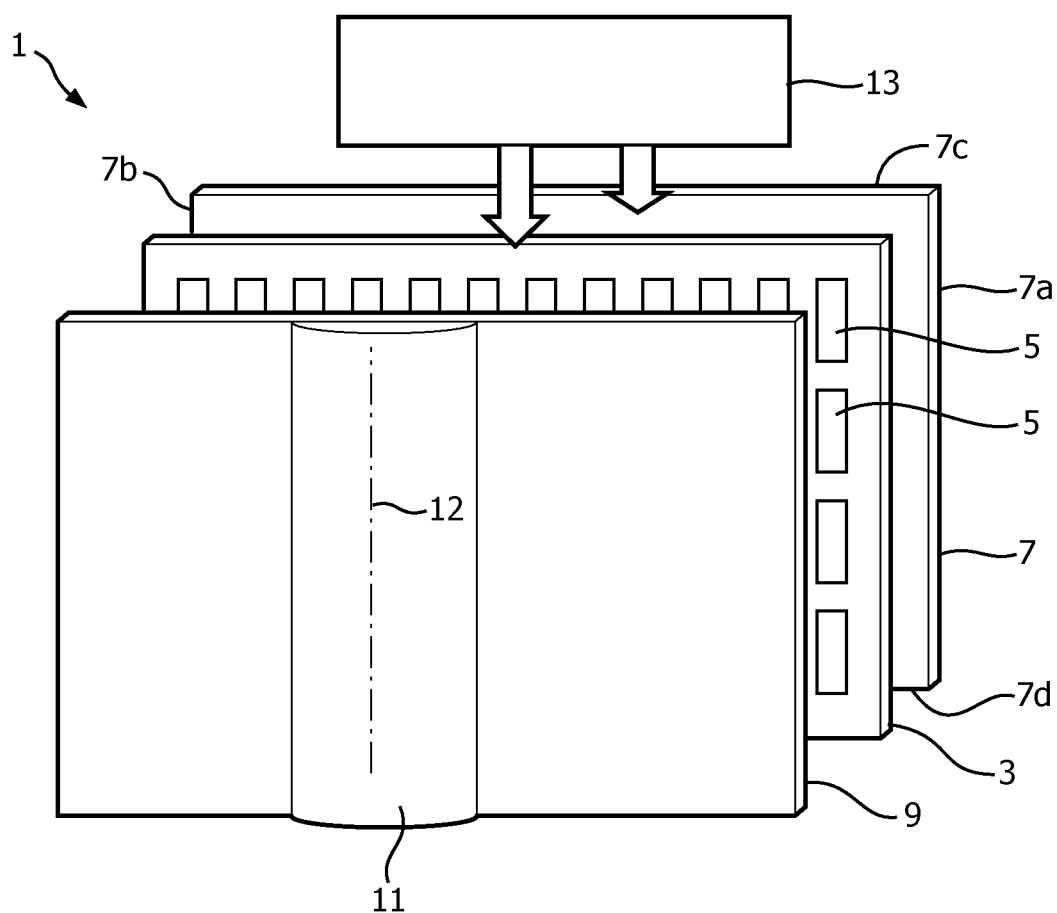
FIG. 1 is a schematic perspective view of a known autostereoscopic display device.
Figure 2:
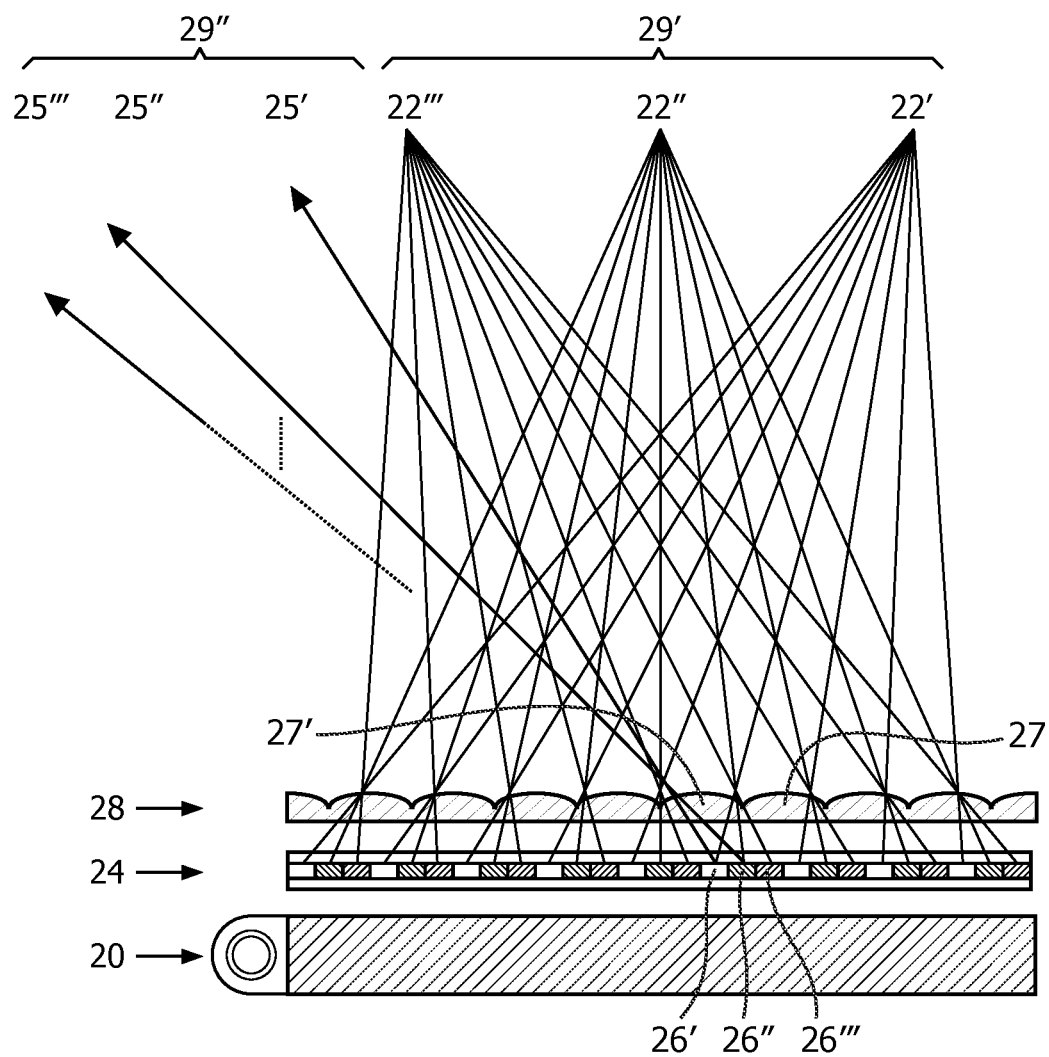
FIG. 2 is a schematic cross sectional view of the display device shown in FIG. 1.
Figure 3:
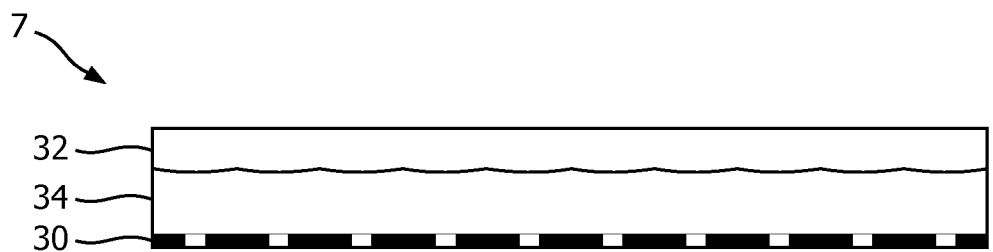
FIG. 3 shows a known directional backlight design using striped emitters.

A second lenticular array 54 is spaced from the display panel 40 and is used in conventional manner to generate multiple viewing directions, as shown in FIG. 2.

The refractive index values of the various layers are shown in FIG. 5. The lenticular arrays are formed of a material having higher refractive index (n=1.53 in this example such as an acrylic material) than the material used in the spacing between them (n=1.41 in this example such as a silicone material).

By way of example, the lens layer material may comprise an acrylic material including: 80% Ethoxylated bisphenol A diacrylate (SR-349 from "Sartomer Company, Inc") and 20% trimethylolpropane triacrylate (TMPTA) with a refractive index of around 1.53. The spacer layer is made of a silicone rubber material (Elastosil RT604 from "Wacker chemicals Inc") with a refractive index of around 1.41. Other materials with appropriate refractive indices may be used.

A detailed design will now be presented including example parameters and optical simulations for an autostereoscopic TV display, but the invention is suitable for a wide range of viewing distances, screen diagonals and display resolutions.

1. 3D Lenticular Display 40, 54

A 3D lenticular display is desired with a low loss of spatial resolution while still providing an optimum stereoscopic experience for each viewer.

The views for a given viewer (which may be considered to be content views) are all provided at the same time, i.e. in one sub-frame with light directed by the backlight towards that particular viewer. The intended use of the display according to the invention is to supply at least two views (left and right), which are possibly viewer-dependent, e.g. taking into account the viewer perspective. For example, if the display is for generating only two views, then the views may not be viewer-dependent, but if more views are generated by the display, the views for selection to display to the viewer may be viewer-dependent. The supplied views are matched to the display views (of which there are at least two but there may be many), based on the viewer position and display parameters/calibration, using a view assignment and weaving step. This might involve mixing of left and right views per sub-pixel or simply picking either left or right per sub-pixel. Thus, the two views to be displayed to the viewer are selected from or derived from a set of display views for the 3D scene being rendered.

There are different options to realize these aims:

(i) A known slanted lenticular design with a low number of views, but preferably at least 4 and for example less than 10. The reason for preferring a low number of views is to reduce the spatial resolution loss. The reason for preferring the use of at least 4 views is that each eye of a user is in one or between two adjacent views and those two views are then assigned to the same input view. When the user moves laterally it is possible to reassign content views (e.g. left and right input view) without the user noticing. A low number N of views with a good distribution of resolution for RGB-striped panels is for example obtained based on:

Number of views N=5, display lenticular pitch $p_H=5*p_{sp}$ where $p_{sp}$ is the sub-pixel pitch, lenticular lens slant angle $\alpha=\tan^{-1}(\frac{1}{3})$.

This design has the disadvantage of "banding" but this can be compensated.

(ii) A "stereo on multiview" design with a higher number of (fractional) views $N_f>10$, where the software rendering bundles several display views into two "effective" views for the left and right eye of each viewer. In this way a good spatial resolution is maintained whereas banding effects are minimized. The larger number of (fractional) views also provides more flexibility, for instance to increase the usable viewing range or to follow lateral movement of the user more precisely, enabling a smaller viewing cone.

(iii) A stereo "eye following" lenticular with steerable optical elements, such as electrowetting lenses, lenses moved or deformed by actuators made of electroactive polymers, variable Gradient Index Lenses (GRIN) made of liquid crystal materials and electrodes, etc. The challenge for this option is the required fast switching of optical components. This option relates to a stereo concept (i.e. exactly two views: left eye and right eye views), where active optical components are used to exactly position the two views on the two eyes of the viewer.

There are few known lenticular designs with N<10 and good 3D properties, i.e. separate addressability of left and right eye, good spatial distribution of 3D pixels, little banding, etc.

In one example an N=5 view design is chosen with slant angle $\alpha=\tan^{-1}(\frac{1}{3})$ for rectangular sub-pixels with a height-to-width ratio of 3 which are surrounded by 10% of black matrix. The horizontal display lens pitch $p_H$ is thus 5 times the sub-pixel pitch $p_{sp}$. For this design, the 3D resolution loss is equally distributed over the horizontal and vertical directions, i.e. equal to a factor of the square root of 5=2.24 in both directions.

A 4K high definition display would thus have in 3D mode operation a resolution slightly worse than a full HD (FHD) display.

Assuming a 48 inch (122 cm) 16:9 display geometry, the display has width dw=107 cm and display height dh=60 cm. The standard viewing distance is vd=3*dh=180 cm.

For a 4K high definition display there are 3840 pixels per row and each pixel is divided into 3 sub-pixels for the colors red, green and blue.

The sub-pixel pitch $p_{sp}$ is thus $p_{sp}$=dw/(3*3840)=92.88 µm.

The horizontal display lens pitch is $p_H=N*p_{sp}$=464.4 µm.

The orthogonal (true) display lens pitch is then $p=p_H*\cos(\alpha)$=440.6 µm and thus simply determined by the display resolution and width dw and the number of views N.

Figure 6:
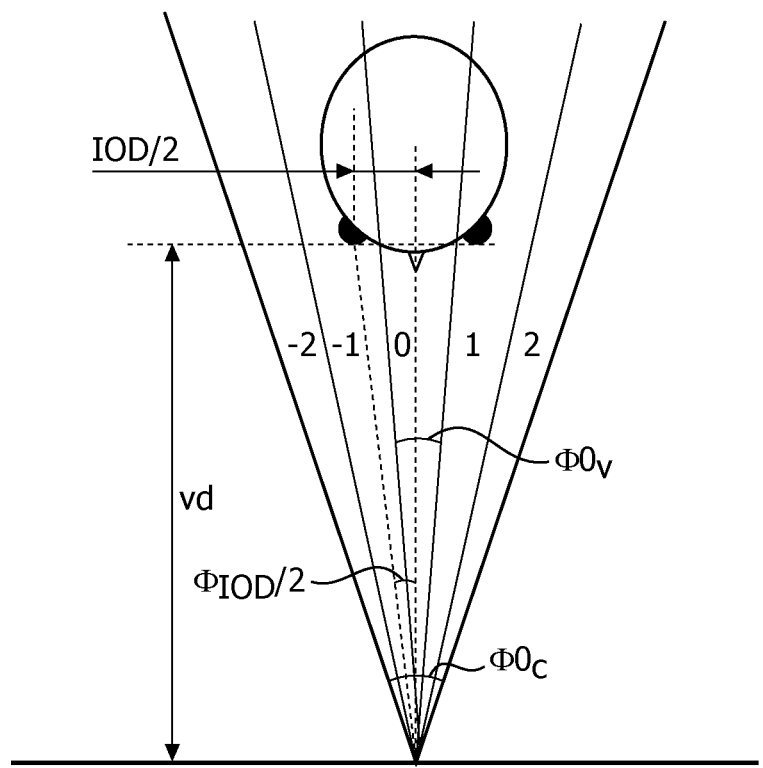
FIG. 6 shows the viewer's intraocular angle $\Phi_{IOD}$ and display cone angle in air $\Phi0_c$ and view angle $\Phi0_v$.

FIG. 6 shows the viewer's intraocular angle $\Phi_{IOD}$ and display cone angle in air $\Phi0_c$ and view angle $\Phi0_v$.

The distance "e" between the display panel and display lens arrangement (shown in FIG. 5) is determined from the demand that the viewer's intraocular angle $\Phi_{IOD}$ should correspond to about twice the display view angle $\Phi0_v$. This is important, because this N=5 view design shows inevitably some overlap between adjacent views and it is chosen to center near-nearest views onto the viewer's eye pair:

$$\Phi_{IOD}=2*\tan^{-1}(IOD/(2*vd))=2.062°$$

This gives a display view angle $\Phi0_v \approx \Phi_{IOD}/2=1.0°$.

The display cone angle in air $\Phi0_c$ is N times $\Phi0_v$ or $\Phi0_c=5*\Phi0_v=5.0°$.

Figure 7:
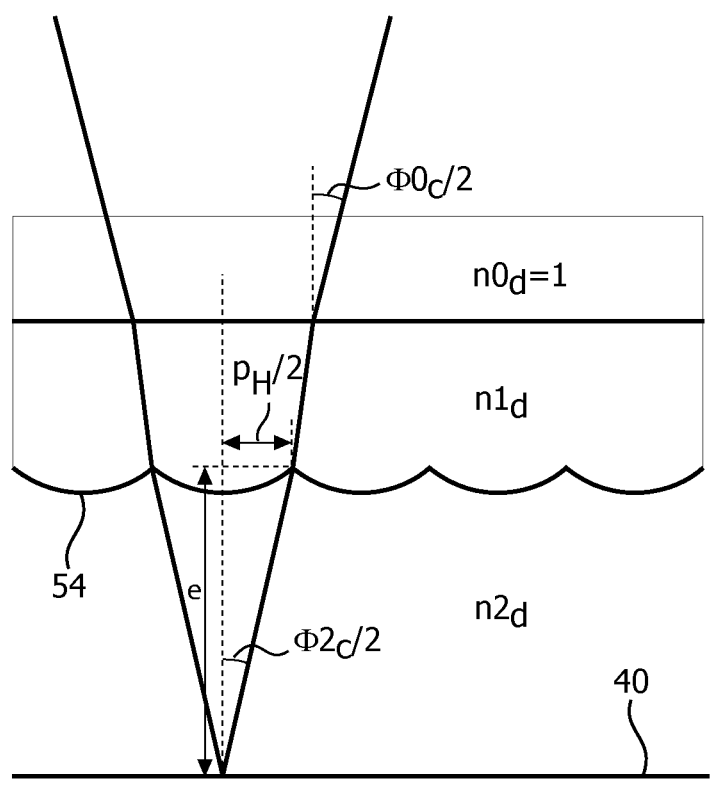
FIG. 7 shows the relationships between the display geometry and display cone angles.

FIG. 7 shows the relationships between the display geometry and display cone angles $\Phi2_c$ and $\Phi0_c$.

The "inner" display cone angle $\Phi2_c$ is obtained from $\Phi0_c$ using Snell's law $\Phi2_c=2*\sin^{-1}((1/n2_d)*\sin(\Phi0_c/2))=3.55°$ (here: $n2_d$=1.41).

Finally, the distance e between the display 41 and the lenticular array is given by:

$$e=p/(2*\tan(\Phi2_c/2))=7.12 \text{ nm}$$

A slightly increased value such as e=7.5 mm in this example may be used to compensate for the decrease of the intraocular angle $\Phi_{IOD}$ for non-central viewing positions of the viewer. In this way a proper 3D viewing experience is ensured throughout the whole illuminated width $\Delta x_{ill}$ of the backlight (discussed further below).

To realize small overlap of views and low banding for a wide viewing angle, for example aiming for ±35°, a lenticular design is chosen with lenses having a small radius of curvature and small refractive index difference across the lens surface. This type of lens is described in detail in WO 2009/147588 A1.

As already shown in FIG. 5, $n2_d$=1.41 and $n1_d$=1.53.

The paraxial focus of the second lenticular 54 must not be placed too close to the display panel, because this would lead to strong overlap of near-nearest views at large viewing angles and increased banding at low angles.

Figure 8:
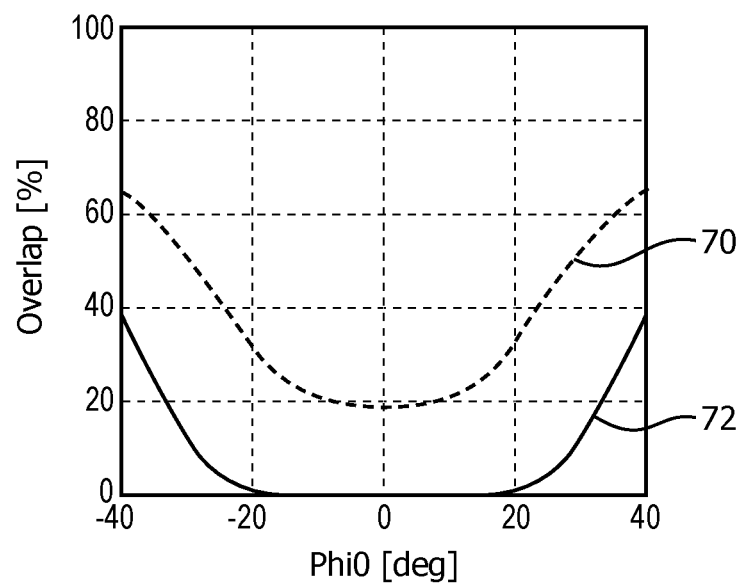
FIG. 8 shows the overlap of adjacent views of the display.

This issue is shown in FIG. 8 which shows the overlap of adjacent views (plot 70) and next-nearest views (plot 72) of the display for f=7.56 mm (e/f~100%).

A view of view number "a" is adjacent to a view of view number "b" if a=b±1. A view of view number "a" is "next nearest" to a view of view number "b" if a=b±2. The overlap for two completely separated views is zero, and the overlap for two identical views is defined as 100%. The overlap of views becomes greater at greater viewing angles.

The overlap of views a and b is defined as:

$$Ovl(a, b) = = \frac{\int Int_a(\varphi 0) \cdot Int_b(\varphi 0) d\varphi 0}{\sqrt{\int Int_a(\varphi 0)^2 d\varphi 0} \cdot \sqrt{\int Int_b(\varphi 0)^2 d\varphi 0}}$$

The function $Int_x$, is the function which defines the (simulated) intensity of view "x" as a function of the angular coordinate φ0 The display optics may be set at a moderate under focus (for example e/f~75%). With this setting, the overlap of next-nearest views at large angles is minimized, because the display is at the position of the "minimum root-mean-square" focus at these angles.

Figure 9:
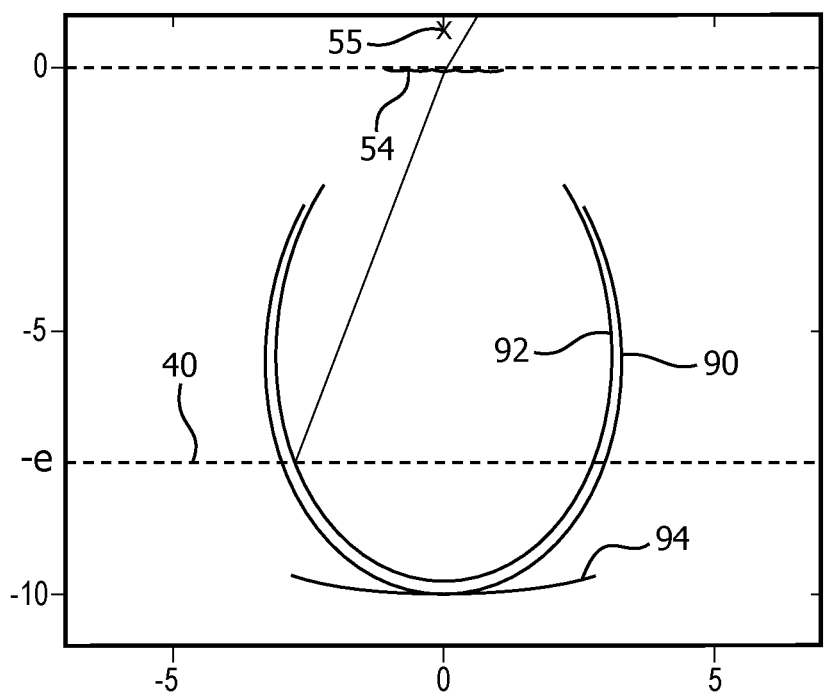
FIG. 9 shows a cross-section of the display panel.

FIG. 9 shows a cross-section of the display panel for this TV example. All measures are in mm.

The radius of curvature R of the display is chosen as R=0.85 mm yielding a paraxial focal length $f=n2_d*R/(n2_d-n1_d)=10.02$ mm.

In FIG. 9, the line 90 represents the so-called paraxial focus. It is constructed from the intersections of adjacent rays that impinge upon the lens surface close to the center of the lens and which originate from a given direction behind the lens. As shown, rays from larger viewing angles which impinge around the center of the lens focus nearer to the lens than rays from the normal direction. The views provided to larger viewing angles are generated by the display at a location which is further from the focus of the lenticular lens 54.

The line 92 represents the locus of those points where the Root Mean Square (RMS) width of the beam is smallest.

The line 94 represents the so-called caustic tip. It is constructed from the intersections of adjacent rays that hit the lens surface perpendicularly. It represents the furthest location from the lens where these rays cross, so that after this caustic tip, all rays are diverging.

FIG. 9 shows the location of the display panel 40 and the display lenses 54 with one lens center shown as 55.

Figure 10:
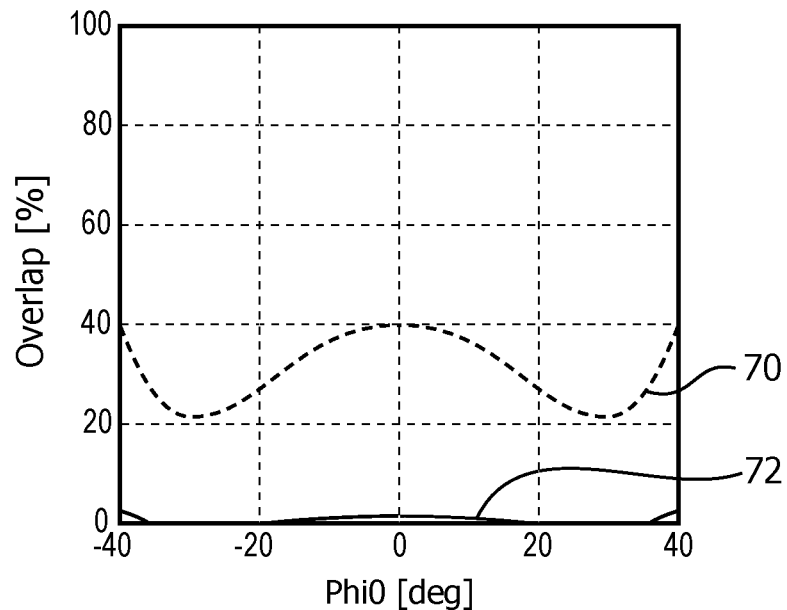
FIG. 10 shows the overlap of adjacent views of the backlight output.

With this particular setting of focal length (f=10.02 mm) the overlap at large angles is significantly reduced with respect to FIG. 8. This can be seen in FIG. 10, which is based on the same parameters as FIG. 8, i.e. f=10.02 mm (e/f~75%).

Figure 11:
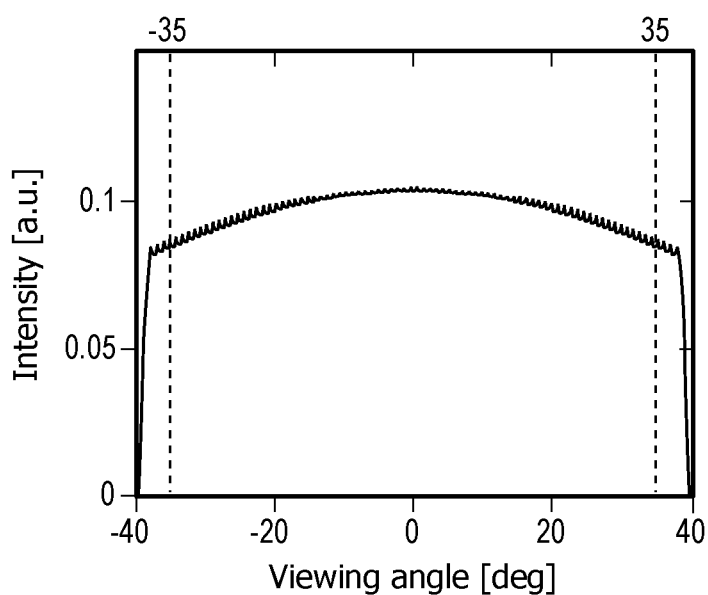
FIG. 11 shows the angular intensity distribution of the display.

Furthermore, the angular intensity distribution of the display optics is more homogeneous over the whole viewing range (covering the display central viewing cone and about 16 viewing cone repetitions). This is shown in FIG. 11, which plots the angular intensity of the 3D display with all views "on". Angles beyond 40° have not been simulated.

2. Light Steering Backlight 41

The backlight is designed to provide an illuminated width $\Delta x_{ill}$ which is as large as possible while still being able to individually address the face of each viewer. This implies that the "cone angle" of the backlight $\Phi 0_{cb}$ should be maximized while a low overlap of next-nearest backlight "views" should be maintained.

To maximize the cone angle, the distance of the backlight lenticular 52 from the light emanating stripes $e_b$ (see FIG. 5) should be minimized for a given backlight lenticular pitch $p_b$.

To create a low overlap the backlight light stripes should be located as close as possible to the focus of the backlight lenticular.

Taking both conditions together the aim is thus to minimize the focal length $f_b=n2_b*R_b/(n2_b-n1_b)$ of the backlight lenticular. $f_b$ is minimized if the difference $n2_b-n1_b$ is maximized by choosing $n1_b=1$ (=air) and $n2_b=1.53$ (Trimethylolpropane triacrylate (TMPTA)-based material as disclosed above) or higher (for example for polycarbonate n=1.58) and at the same time minimize the radius of curvature $R_b$.

For a circular cross-section of the lenticular elements, the minimum radius of curvature is given by $R_b=p_b/2$. A mild under-focus ($e_b/f_b$~85%) is advantageous to maintain a moderate overlap (~20%) of adjacent backlight views to be able to illuminate a viewer's face at any possible location.

In this way the relative backlight dimensions $e_b$ and $R_b$ are determined as multiples of the backlight pitch $p_b$.

The absolute backlight dimensions are determined by the pitch of the light emanating stripes $p_s$ and the number of backlight "views" $nv_b$, because $p_b=p_s*nv_b$.

The number of views $nv_b$ is calculated as the ratio of illuminated width $\Delta x_{ill}$ and the viewer's face width fw:

$nv_b=\Delta x_{ill}/fw$. There is one remaining degree of freedom, i.e. the pitch of the light stripes $p_s$.

This degree of freedom can be used to minimize moiré-like angular intensity fluctuations which are arising from the combination of two lenticular arrays. It has been proven advantageous to adjust the backlight dimensions in such a way that the ratio of the horizontal lens pitches of backlight $p_b$ and display $p_H$ is an integer multiple Np larger than 1 and smaller than 6: $p_b=Np*p_H$, 1<Np<6.

The banding effect due to the black matrix between the light emanating stripes is minimized, if the lens centers of backlight and display are at the same lateral position for even values of N, but shifted by $p_H/2$ (i.e. backlight lens center and display lens edges at the same lateral position) for odd values of N.

Figure 12:
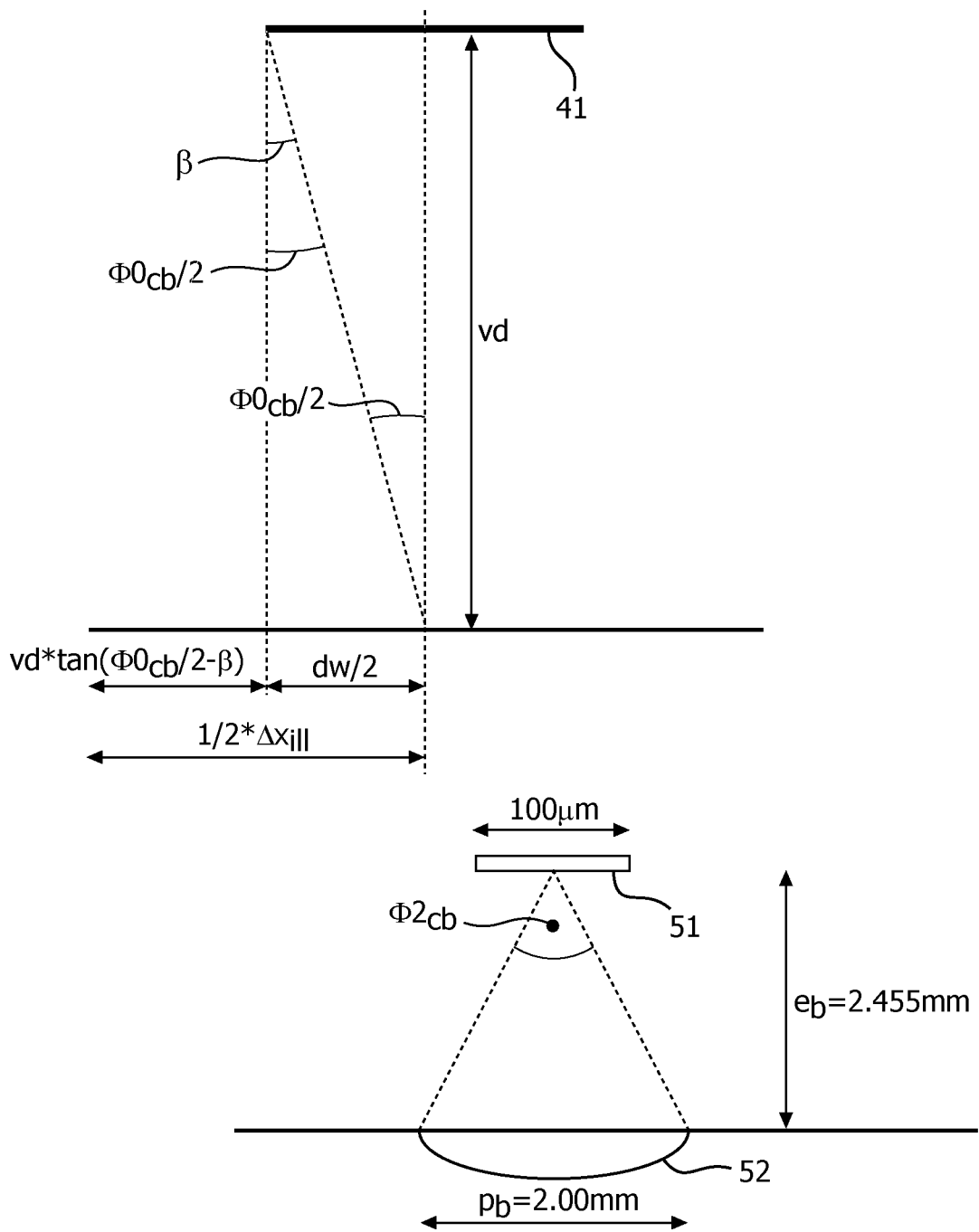
FIG. 12 a backlight cone angle and illuminated width as output from the overall backlight.

FIG. 12 shows the backlight cone angle and illuminated width as output from the overall backlight 41. It also shows dimensions within the backlight. Assuming a 48" (122 cm) 16:9 display geometry a display width dw=107 cm and display height dh=60 cm, the standard viewing distance is vd=3*dh=180 cm. The center of illumination at the display edges is inclined by an angle $\beta=\tan^{-1}(dw/(2*vd))=16.5°$. The cone angle of the backlight $\Phi 0_{cb}$ should be as large as possible (for example 70°) to have a large illuminated width $\Delta x_{ill}$.

A backlight cone angle of 70° would thus correspond to an illuminated width:

$$\Delta x_{ill}=2 \cdot (vd \cdot \tan(\Phi 0_{cb}/2-\beta)+dw/2)=229 \text{ cm}$$

Assuming that the viewer's face width is fw=15 cm it is necessary to provide $nv_b=\Delta x_{ill}/fw=16$ backlight "views" with an angular width of 70°/16=4.4°. If the light emanating stripes have a width of 100 μm and are surrounded by 25% black matrix then the pitch of the light stripes is 125 μm and the pitch of the backlight lenticular is $p_b=125$ μm*$nv_b=2.00$ mm.

The distance of the backlight lenticular 52 from the light stripes is derived from the backlight cone angle as $e_b=2.455$ mm.

As shown in FIG. 12, the inner cone angle between the backlight stripe and lens $\Phi 2_{cb}=2*\tan^{-1}(p_b/(2*e_b))=44.3°$. The backlight cone angle is given by:

$$\Phi 0_{cb}=2*\sin^{-1}(n2b*\sin(\Phi 2_{cb}/2))=70.5°.$$

For a circular cross-section of the lenticular elements the minimum radius of curvature is given by $R_b=p_b/2=1.00$ mm and the focal length is $f_b=2.89$ mm.

Figure 13:
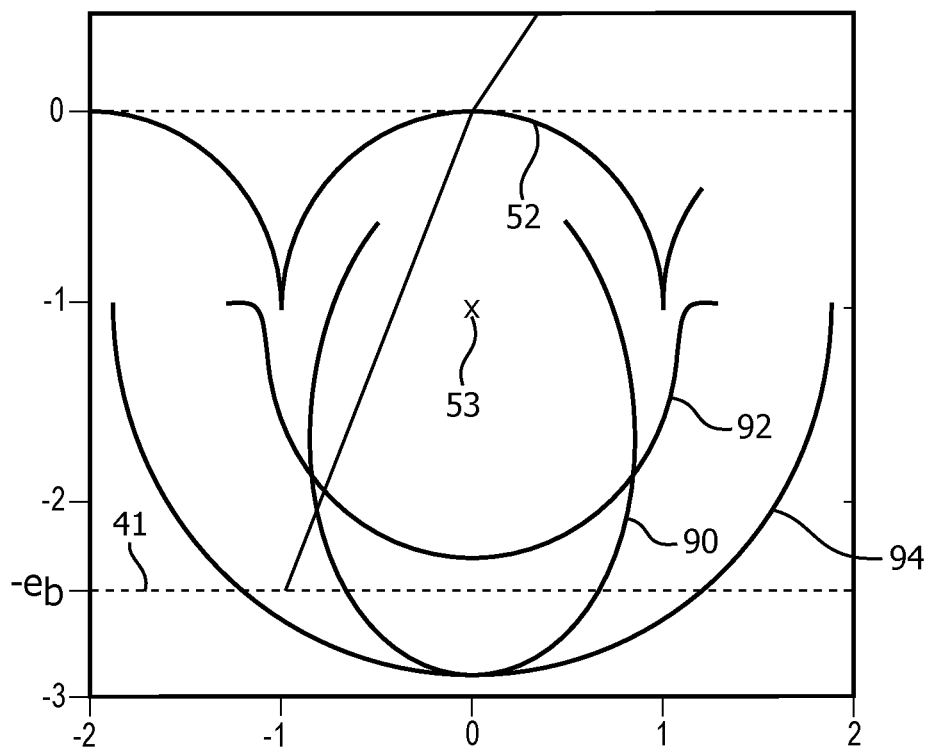
FIG. 13 shows a specific design of backlight in more detail.

This specific design of backlight is shown in FIG. 13. As in FIG. 9, all measures are in mm and the same reference numbers are used as in FIG. 9 for the paraxial focus 90, caustic tip 94, minimum RMS focus 92. FIG. 13 shows the location of the backlight stripes 41 and the backlight lenses 52 (with lens center 53).

Figure 14:
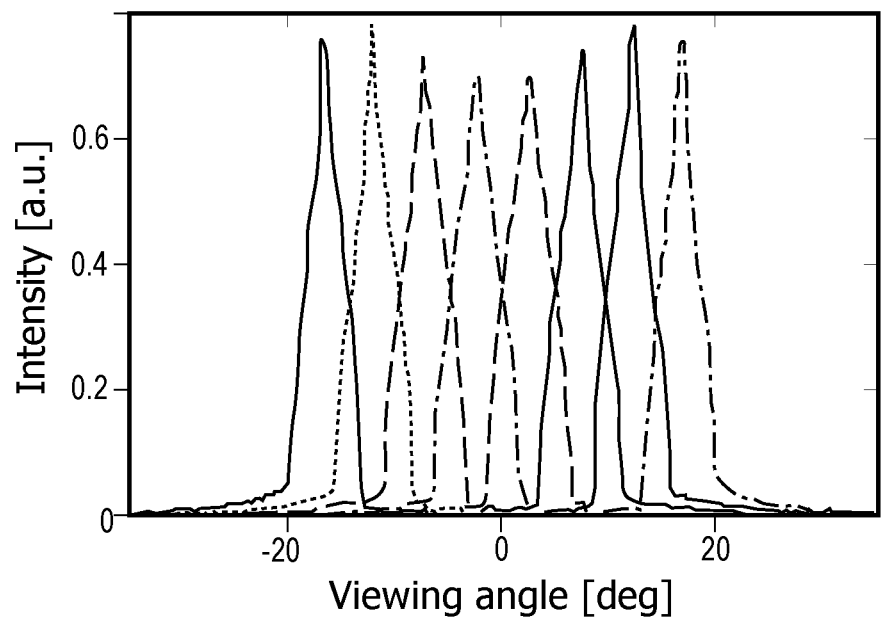
FIG. 14 shows the angular profiles of 8 views of the backlight of FIG. 13.
Figure 15:
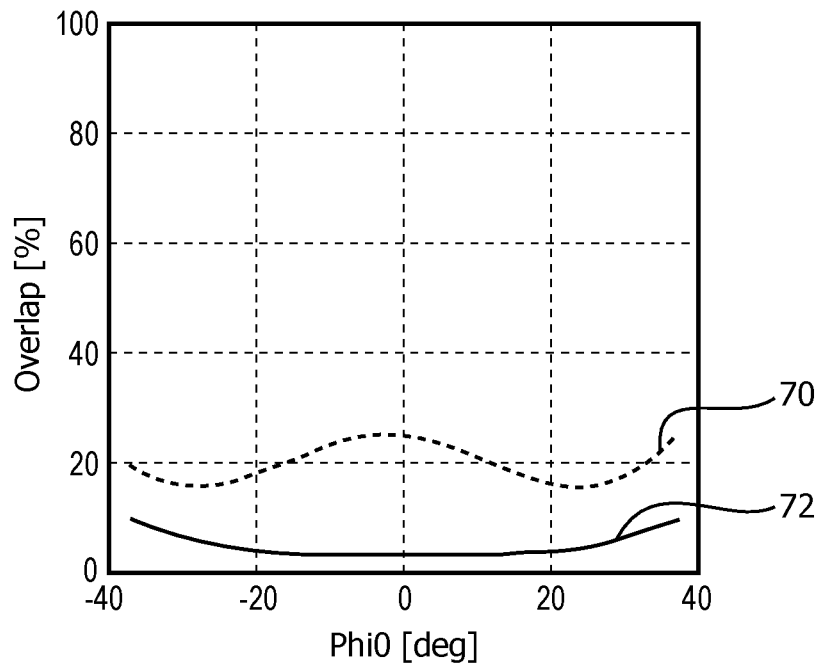
FIG. 15 shows the overlap of adjacent and near-nearest views of the backlight of FIG. 13.

When performing a ray tracing simulation for the backlight the views have good angular profiles as shown in FIG. 14 with moderate overlap (~20%) of adjacent views. FIG. 14 shows the angular profiles of 8 views of the backlight and FIG. 15 shows the overlap of adjacent and next-nearest views of the backlight.

Figure 16:
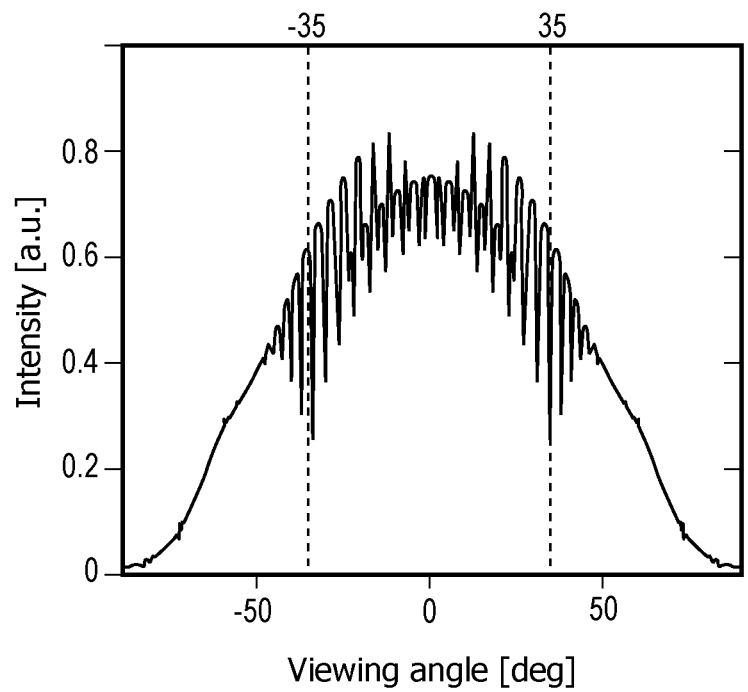

FIG. 16 shows the angular intensity of the backlight with all light stripes on and it shows that the design does have some banding, i.e. angular intensity oscillations if all light stripes are on.

Figure 17:
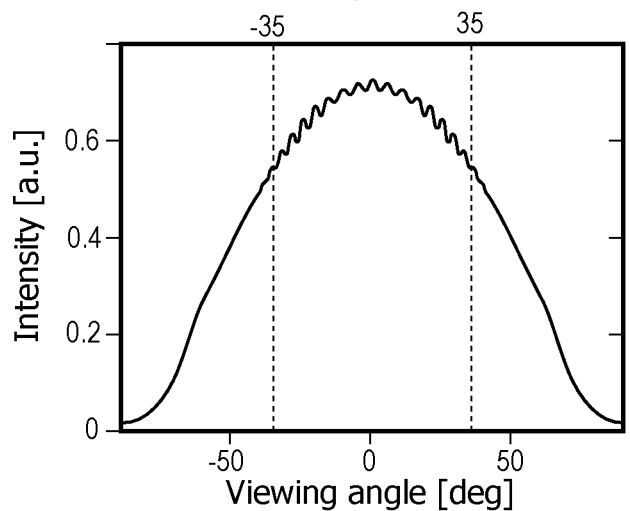
FIG. 17 shows a smoothed angular intensity profile of the backlight by using a diffuser sheet.

This banding can be suppressed if desired by adding a diffuser sheet on top of the backlight lenticular as shown in FIG. 5. Assuming a Gaussian angular profile of the diffuser with a standard deviation wd=1.3° the smoothed angular intensity profile of the backlight is shown in FIG. 17.

Of course, by introducing a diffuser, the individual views are broadened and overlaps are increased, but not in an excessive manner because the views are already very wide.

Figure 18:
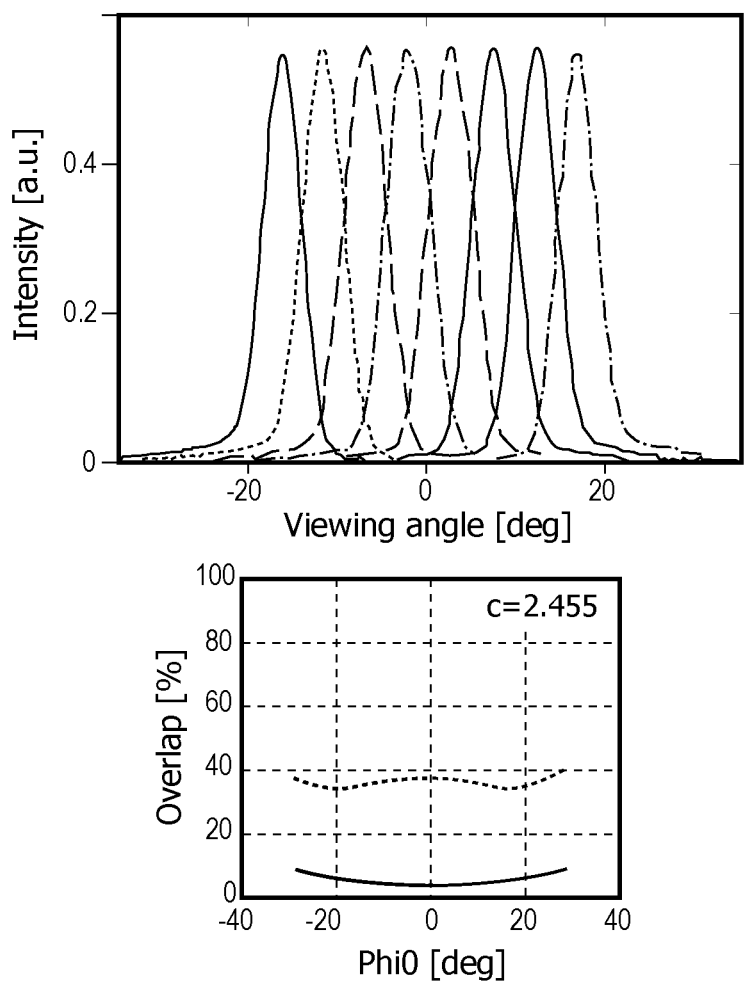
FIG. 18 shows the angular profiles of 8 views (left image) and the view overlaps (right image) when using a 1.3° diffuser sheet for comparison with FIGS. 14 and 15.

FIG. 18 shows the angular profiles of 8 views (left image) and the view overlaps (right image) when using a 1.3° diffuser sheet for comparison with FIGS. 14 and 15.

The applicability of this backlight concept can be demonstrated by considering a worst case situation.

Figure 19:
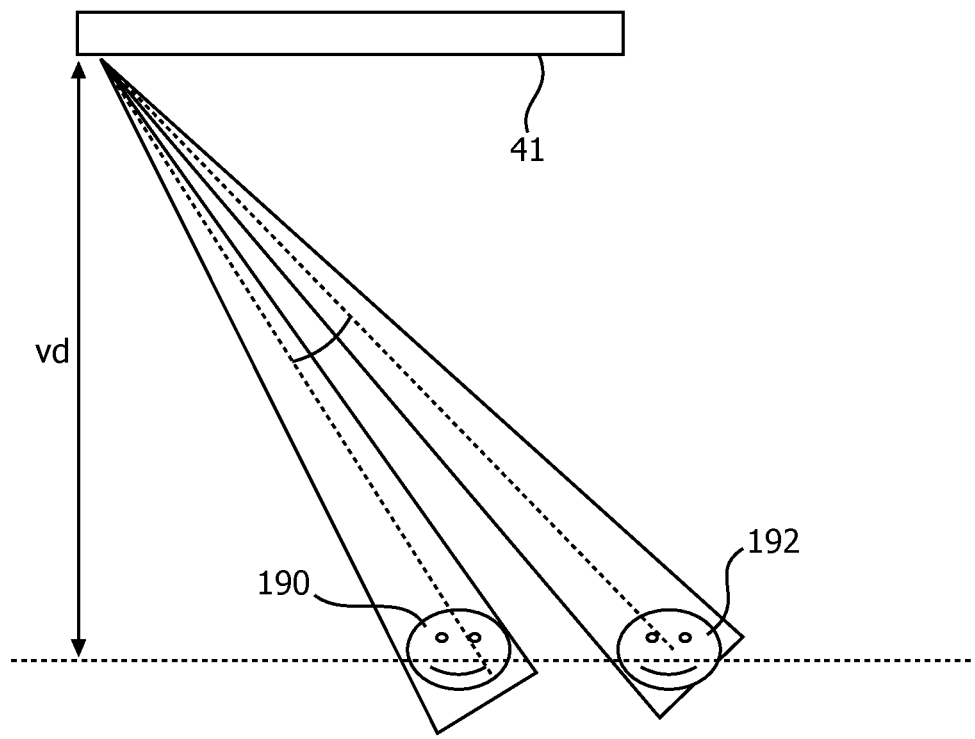
FIG. 19 shows a most difficult viewer arrangement for the display to function in which there is a left viewer and a right viewer.

This situation is shown in FIG. 19. There are two viewers 190, 192 sitting shoulder to shoulder, i.e. 50 cm apart, at a viewing distance vd=180 cm from the screen. The right viewer 192 is located at the right edge of the illuminated width. Both viewers are observing the left edge of the display, so that the viewing angles are 25.3° and 16.7°, respectively.

The angular separation of the adjacent eyes is thus 25.3°–16.7°=8.6°, i.e. about 2 backlight view widths (=4.4°). This is sufficient to ensure a small overlap of intensities.

Figure 20:
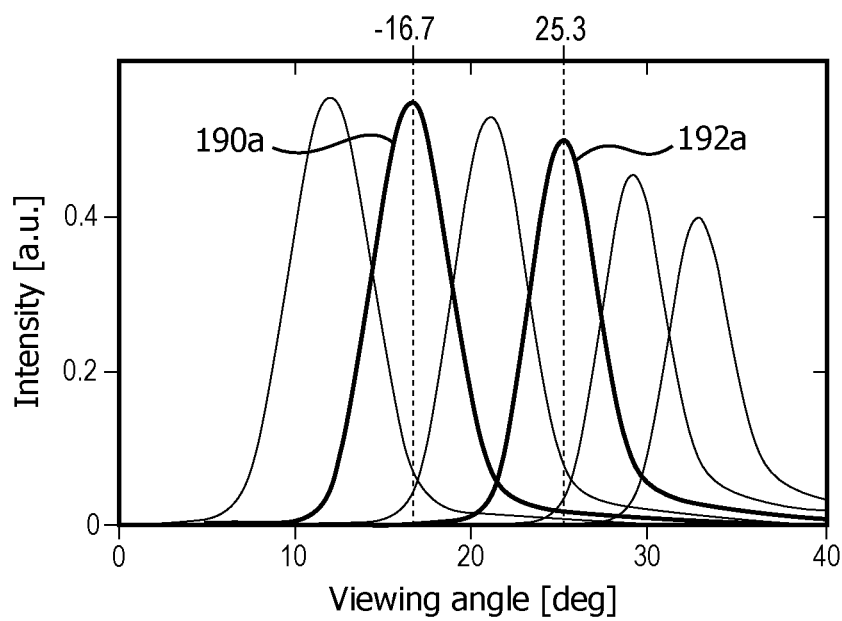
FIG. 20 illustrates the intensities for the views illuminating the left and right viewers.

This is shown in FIG. 20 which illustrates the intensities for the views illuminating the left viewer (plot 190a) and the right viewer (plot 192a). The overlap (evaluated at the centers of the plots 190a and 192a) is small.

As mentioned above, there are various options for the number of views of the 3D scene which are generated and how they are processed to create the pair of views to be displayed to an individual viewer. The options depend on how many views are generated by the combination of the display panel and the second lenticular lens.

If the second lenticular lens array is a 2-view lens, then the controller has to shift the lens in order to steer the views to the user.

If the second lenticular lens array is a multi-view lens (more than two views), then the controller has to assign the content views to the sub-pixels of the display panel such that the left content view is visible in the left eye, and the right content view in the right eye. This operation is typically called view assignment, weaving or interleaving.

The image content has views, including at least one for the left and one for the right eye. For example, the display may be used to play a Blu-ray 3D disc with stereoscopic content. The views might also be rendered to take into account the perspective of the user, for instance with 3D games (so the user can look around corners).

The backlight also provides view generation, but this is in the form of light bundles because they are not necessarily pixelated. In each sub-frame, some backlight stripes are turned on such that light bundle is created for the eyes of one viewer, but not the others.

Backlight stripes might be segmented to enable local dimming functionality to improve dynamic contrast ratio. Local dimming is often used in high-end 2D LCD televisions.

The sub-system formed by the combination of the display panel and the second lenticular lens combination generates projected views. This could be a two-view lens with shifting or a multi-view, possibly slanted, fractional lens with stereo rendering.

Figure 21:
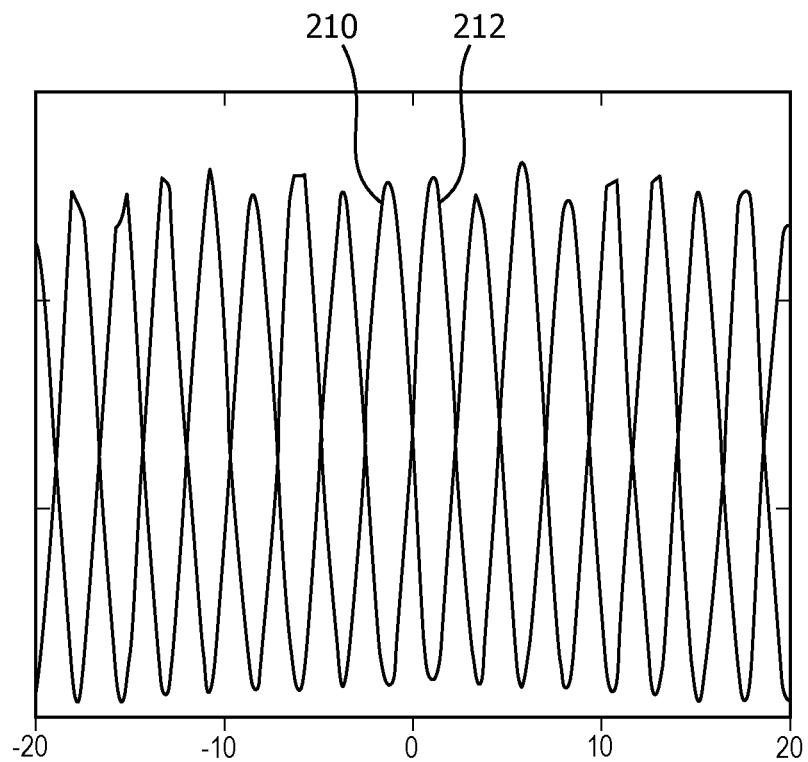
FIG. 21 shows the intensity of a two view system as a function of viewing angle.

FIG. 21 shows the intensity (in arbitrary units) of a two view system on the y-axis as a function of viewing angle (in degrees, on the x-axis). By "two view system" is meant a single stereo pair of views, i.e. 2 rendered views. Position zero corresponds to a normal position relative to the display screen. Plot 210 is the intensity distribution for one view and plot 212 is the intensity distribution for the other view. The two views are somewhat overlapping so that there are only moderate intensity variations when moving the head sideways.

Figure 22:
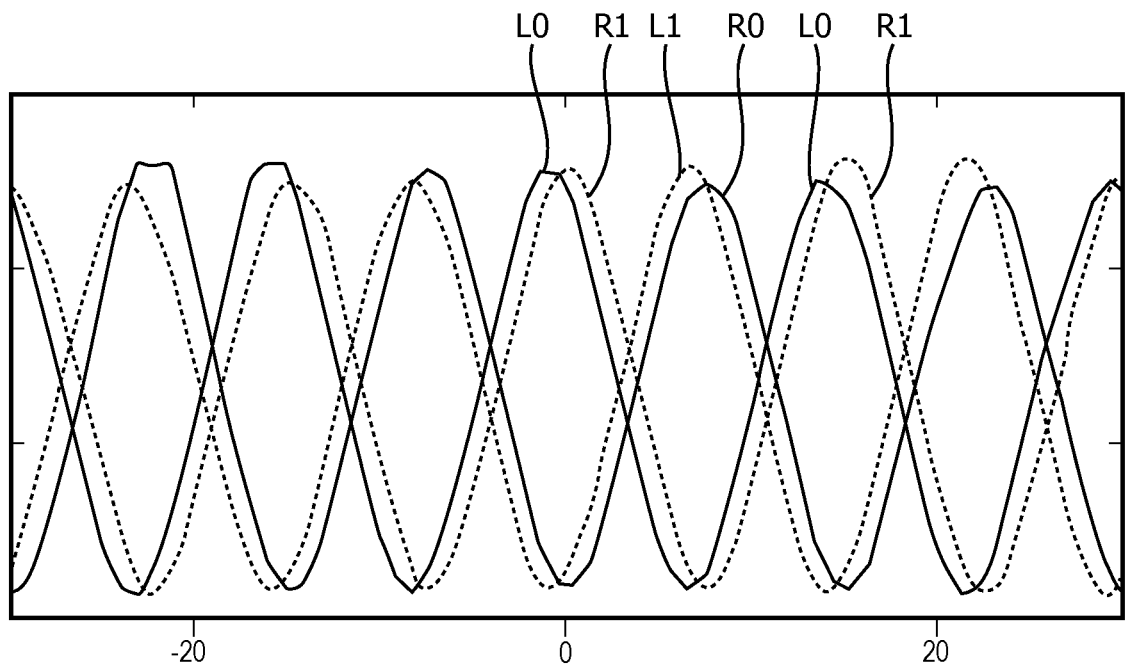
FIG. 22 shows the intensity for the two view system as a function of the lateral position with respect to the screen.

FIG. 22 shows the intensity (in arbitrary units) for the two view system on the y-axis as a function of the lateral position of the viewer's face with respect to the screen (in cm, on the x-axis). The observed screen point is considered at the central position (x=0).

In FIG. 22 there are two views; named view 0 and view 1. The face position on the x-axis denotes the x-position of the tip of the nose of the viewer. Each curve shows the intensity of each view entering each eye, hence 4 curves. For example, the curve L0 is the intensity of view 0 entering the left eye. R1 is the intensity of view 1 entering the right eye. Similarly L1 is the intensity of view 1 entering the left eye and R0 is the intensity of view 0 entering the right eye.

At an optimum face position (e.g. at face position 0) L0 is at its maximum and L1 is near zero so that view 0 can be presented to the left eye. At the same face position, R1 is at its maximum and R0 is near zero so that so that view 1 can be presented to the right eye. At a face position around 6 cm L1 is at its maximum and L0 is near zero, so the image intended for the left eye will then be switched to view 1. At the same face position, R0 is at its maximum and R1 is near zero, so the image intended for the right eye will then be switched to view 0.

Between these positions, for example at around 3 cm, all intensities are about equal (L0=L1=R0=R1). This means that for any choice of switching the images (left image onto view 0 and right image onto view 1 or vice versa) each eye would see the same content, i.e. both images, and the 3D viewing effect is lost.

The intensity distributions are shown for the intended (designed) viewing distance.

To produce an autostereoscopic effect, the views are switched such that for each eye, the view with the higher intensity is addressed. Thus, the input views (i.e. the image content) are assigned per sub-pixel according to the estimated visibility of each sub-pixel for the left and right eye of the viewer. A sub-pixel which is imaged by the second lenticular to the right eye is assigned a pixel of the right eye image content, and a sub-pixel which is imaged by the second lenticular to the left eye is assigned a pixel of the left eye image. As explained with reference to FIG. 2, the relative position of each sub-pixel beneath the (second) lenticular lens determines the direction to which the sub-pixel is imaged. The visibility is estimated based on an estimate of the position of the viewer with respect to the display.

A view parameter can be defined of the relative strength of the intensity of the desired view compared to the undesired view (or views):

$$h_{3D} = \frac{I_{good} - I_{bad}}{I_{good} + I_{bad}}$$

where $I_{good}$=Intensity intended for that eye and $I_{bad}$=Intensity intended for the other eye.

Figure 23:
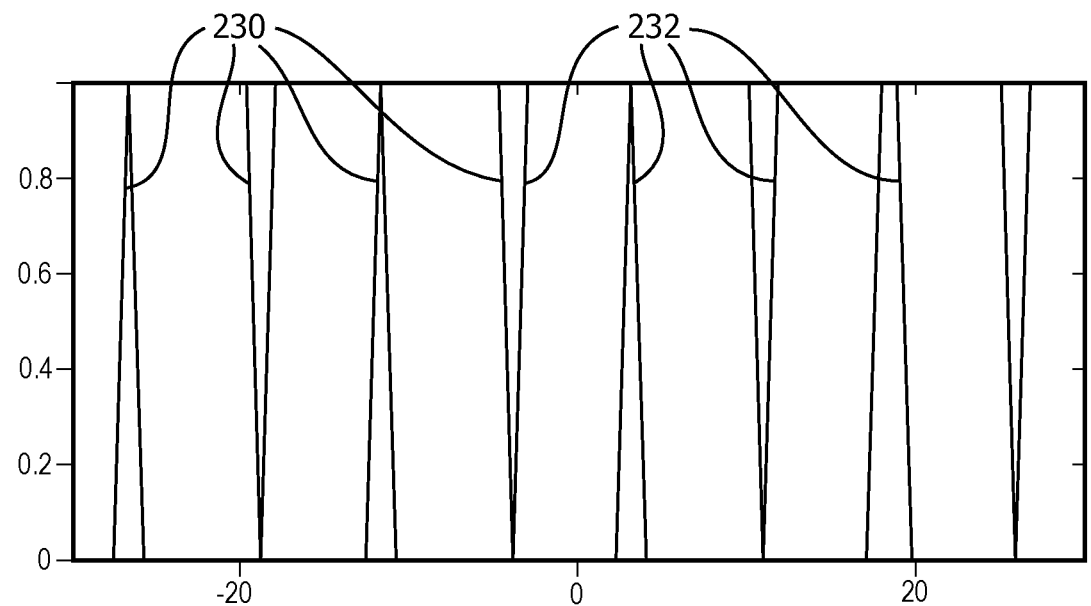
FIG. 23 shows how the views are switched between 0 and 1 for the two eyes.

FIG. 23 shows how the views (the view number is on the y-axis) are switched between 0 and 1 for the two eyes. Plot 230 is for the right eye and plot 232 is for the left eye.

Figure 24:
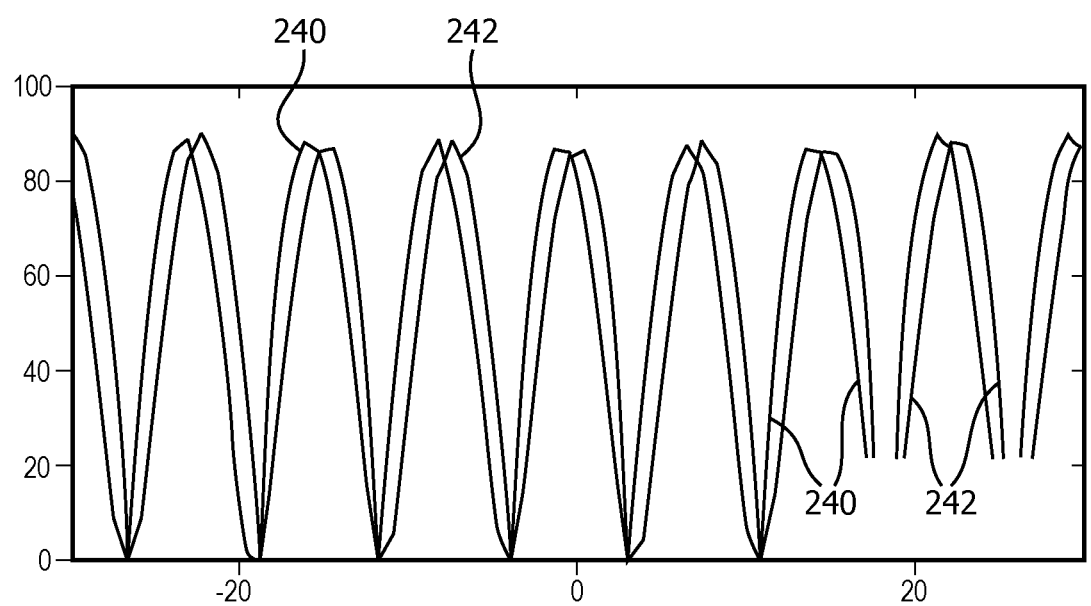
FIG. 24 shows a view quality parameter as a function of viewing distance.

FIG. 24 shows the view parameter defined above as a function of lateral viewing distance from the center, with plot 240 for the left eye and plot 242 for the right eye. It shows that there are equally spaced positions where the 3D experience is lost. This is an inevitable consequence of working with only two fixed views.

One of the options outlined above is to use steerable optical elements with eye tracking to follow the face.

The alternative is to use fixed optical elements and use more than two views.

Figure 25:
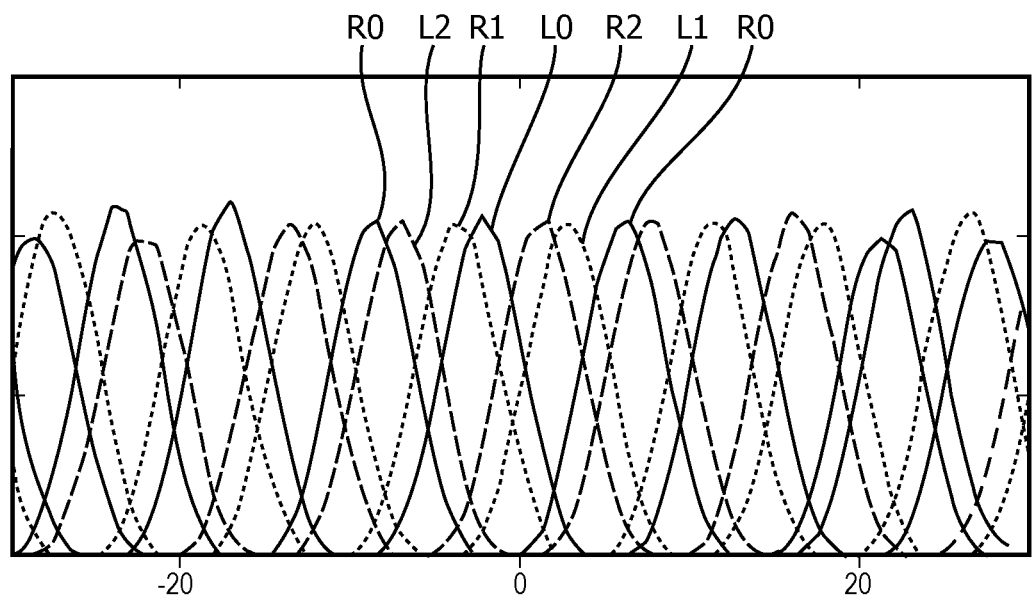
FIG. 25 corresponds to FIG. 22 but for three views.

FIG. 25 corresponds to FIG. 22 but for three views. Again, the intensity distributions are shown as function of the lateral position of the viewer's face when observing a screen point at position x=0.

L0 is the intensity distribution for presenting view 0 to the left eye. L1 is the intensity distribution for presenting view 1 to the left eye. L2 is the intensity distribution for presenting view 2 to the left eye. R0 is the intensity distribution for presenting view 0 to the right eye. R1 is the intensity distribution for presenting view 1 to the right eye. R2 is the intensity distribution for presenting view 2 to the right eye.

Figure 26:
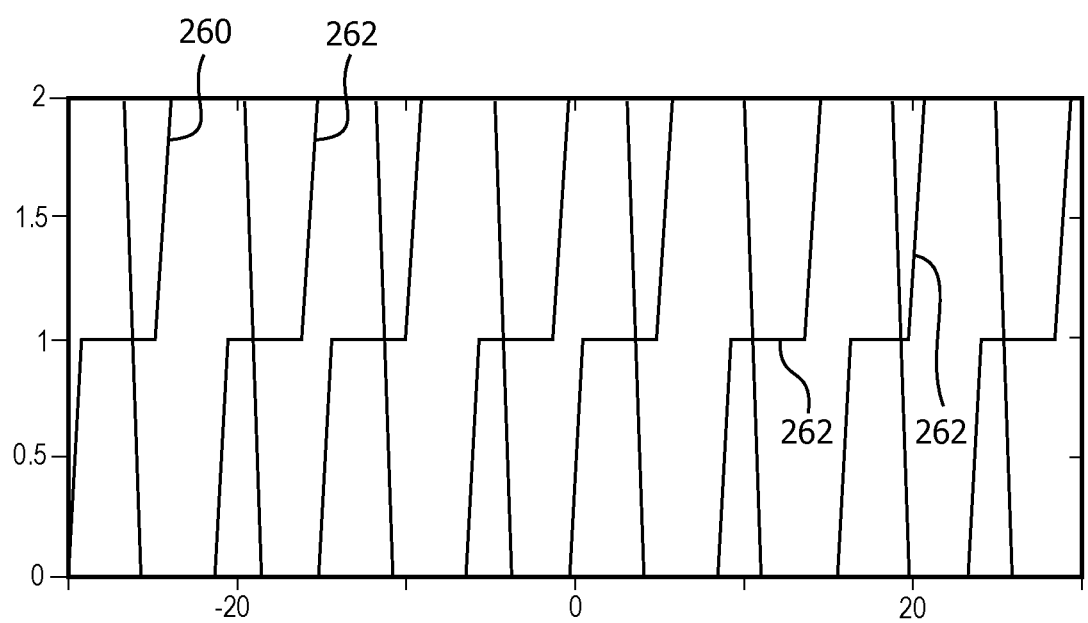
FIG. 26 shows how the views are switched between 0, 1 and 2 for the two eyes.

FIG. 26 shows how the views (the view number is on the y-axis) are switched between 0, 1 and 2 for the two eyes. Repeating plot 260 is for the right eye and repeating plot 262 is for the left eye.

Figure 27:
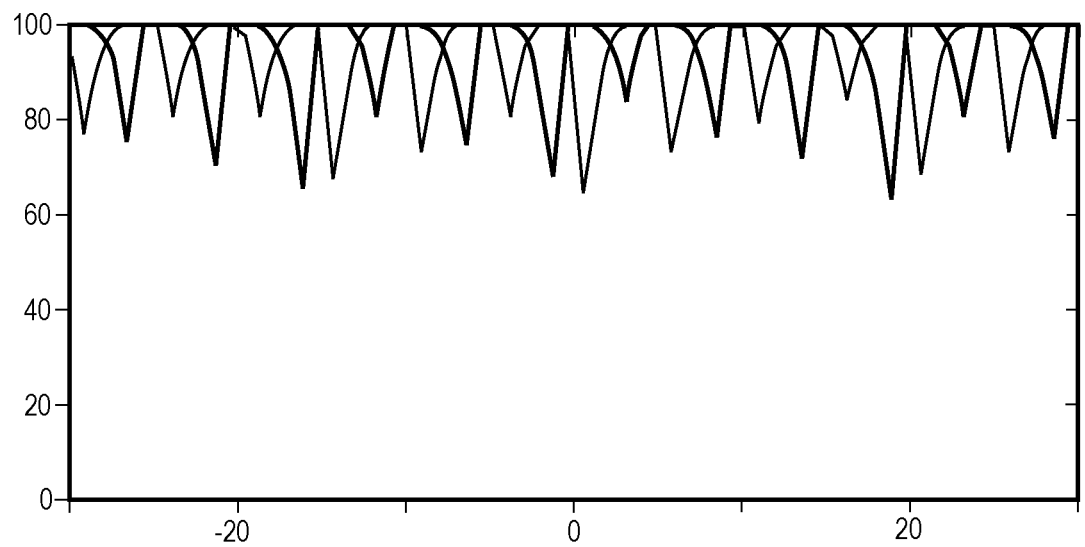
FIG. 27 shows the view quality parameter as a function of viewing distance for FIG. 25.

FIG. 27 shows the view parameter as a function of the lateral viewing distance, for the two eyes.

FIG. 27 shows that an improved but not optimum 3D experience is possible with 3 fixed views. This is a consequence of the overlap of adjacent views and the fact that always adjacent views are switched to the left and right eye.

It has been found that using at least 4 views enables a high quality autostereoscopic viewing experience.

Figure 28:
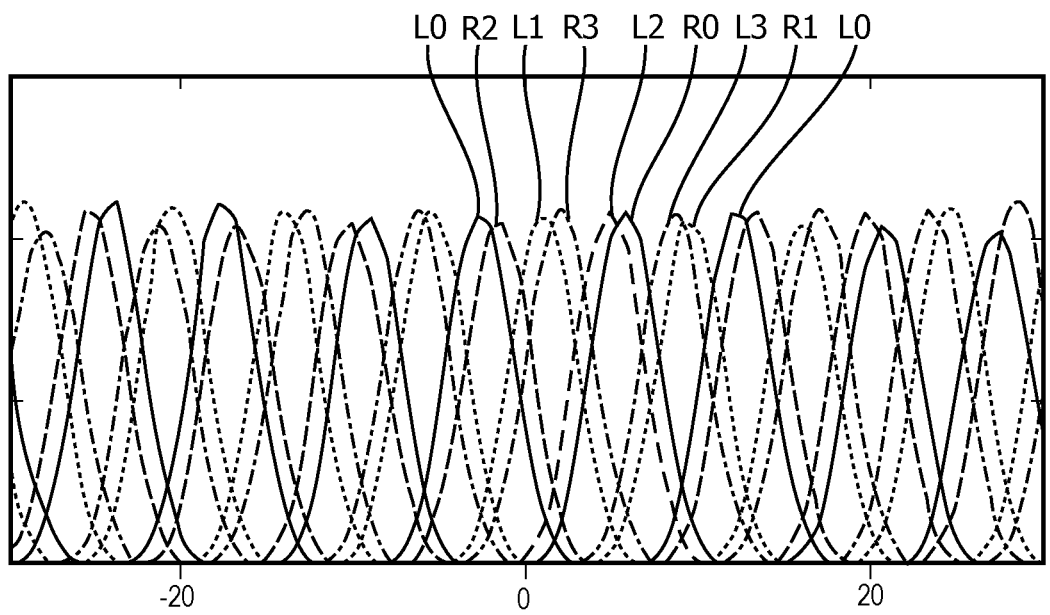
FIG. 28 corresponds to FIG. 22 but for four views.

FIG. 28 corresponds to FIG. 22 but for four views. Again, the intensity distributions are shown as a function of the lateral position of the viewer's face when observing a screen point at position x=0.

L0 is the intensity distribution for presenting view 0 to the left eye. L1 is the intensity distribution for presenting view 1 to the left eye. L2 is the intensity distribution for presenting view 2 to the left eye. L3 is the intensity distribution for presenting view 3 to the left eye. R0 is the intensity distribution for presenting view 0 to the right eye. R1 is the intensity distribution for presenting view 1 to the right eye. R2 is the intensity distribution for presenting view 2 to the right eye. R3 is the intensity distribution for presenting view 3 to the left eye.

The next adjacent views (R=L±2) can thus be switched to the left and right eye.

Figure 29:
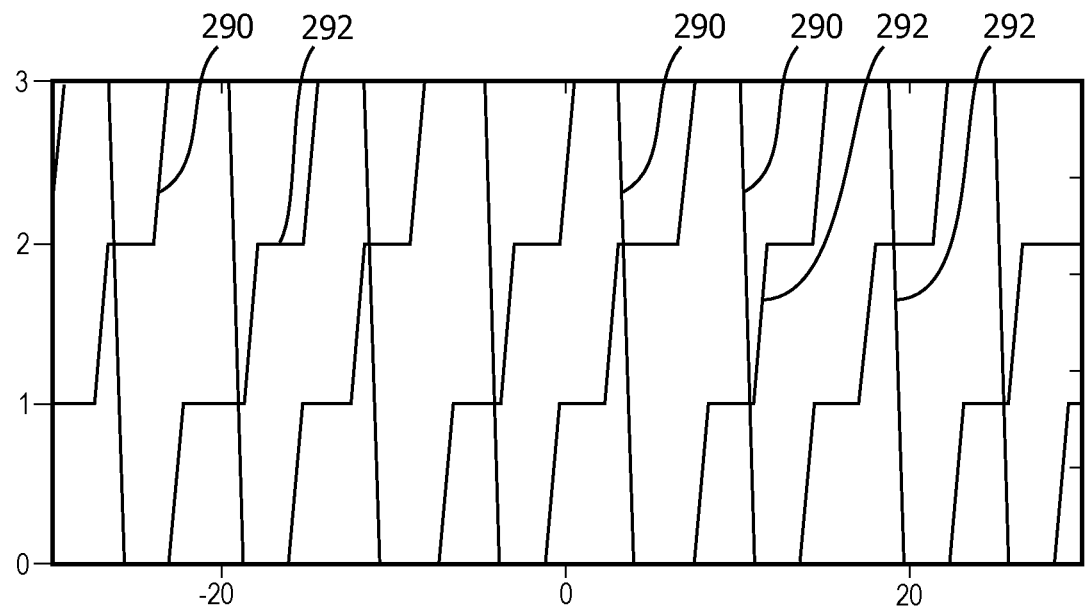
FIG. 29 shows how the views are switched between 0, 1, 2 and 3 for the two eyes.

FIG. 29 shows how the views (the view number is on the y-axis) are switched between 0, 1, 2 and 3 for the two eyes. Repeating plot 290 is for the right eye and repeating plot 292 is for the left eye.

Figure 30:
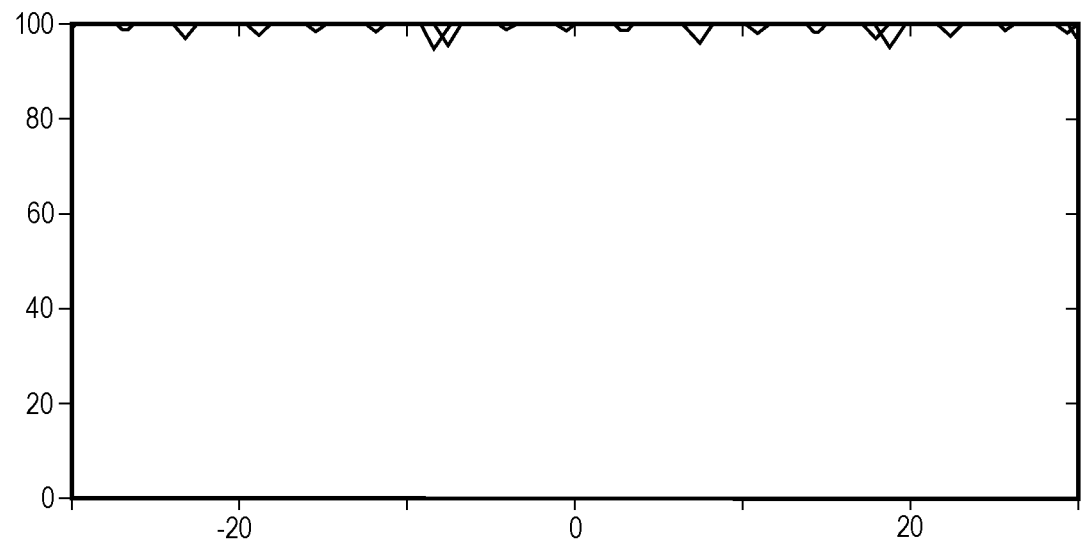
FIG. 30 shows the view parameter as a function of viewing distance for FIG. 28.

FIG. 30 shows the view parameter as a function of the lateral viewing distance, for the two eyes. It shows that an optimum 3D experience is indeed possible with at least 4 fixed views.

3. Other Design Considerations

Even when the display is designed for a certain viewing distance (e.g. 180 cm), still due to the large viewing cone of the backlight, the display is fully usable for a large viewing range. When moving closer (to about ⅔ of the viewing distance), more backlight views are in between the viewers, which increases the number of backlight views between the viewers and thus reduces crosstalk in between the viewers. The limit is determined by the autostereoscopic display because the crosstalk in between the left and right eye will increase and the stereo effect will fully diminish when there is one viewing cone in between the eyes of the viewer (typically at ½ of the intended viewing distance). When the actual viewing distance is larger than intended, then there will be less backlight views and the autostereoscopic views between the viewers and both intrapersonal and interpersonal crosstalk will gradually increase with distance.

The above example performs well at 4/3 of the intended distance. It also depends on the content whether this crosstalk is visible. To some extent, a wide viewing angle and a large viewing distance range can be traded for each other by tuning lens parameters.

As is clear from the description above, the display optics is generally designed for one particular viewing distance. However, one advantage is the additional possibility to adapt the view rendering to a wide range of viewing distances, because the different viewers are addressed time sequentially. When a viewer is closer to the display (e.g. at ⅔ of the optimum distance), the angular distance between his eyes will be increased (by a factor of 3/2), therefore the optimum 3D experience can be maintained if the view rendering will increase the view index difference between both eyes by the same factor (from 2 to 3). The opposite can be implemented when a viewer is at a larger distance from the display (e.g. at 4/3 of the optimum distance). This adaptation may be implemented by using different rendering of the set of display images to generate the views to be presented to the tracked viewer.

The viewing distance (the position of the eyes) is also used to determine which backlight stripes to illuminate. The light beams should be generated to converge at that viewing distance such that the display is uniformly visible for a viewer at that position. This is known as viewing distance correction. When the physical lens pitch is denoted p, then the render pitch is p' is derived according to:

$$p'/p=(V+D)/V$$

where V is the viewing distance and D is the optical thickness. The optical thickness is the (integral of the) physical thickness divided by the index of refraction. The correction is small but significant, e.g. V=1 m, D=2 mm gives p'/p=1.002.

Typically the lens arrays used are plano convex because this is easier to manufacture, but it is possible to laminate two arrays in perfect alignment to produce a combined convex lens array. This allows for producing stronger lenses, and this in turns allows for reducing the aberrations that cause the tails in the intensity distributions of the backlight views, or for increasing the viewing angle of the display. It also allows for using lower index differences and this reduces haze due to reflections in the backlight unit.

As explained above, the maximum radius of curvature for a cylindrical lens is half the lens pitch. The eccentricity of the lens can be raised from 0 (circle) to 1 (parabolic) or in between (elliptical). The effect of raising the lens eccentricity is that a smaller radius of curvature can be used and that the lens is less thick, but at the cost of increasing the tails of the intensity profiles of the backlight views. By way of example a suitable value is an eccentricity in the range of 0.3 to 0.5, for example 0.4.

The invention may be used in autostereoscopic displays for multi-user devices such as computer monitors, TVs and signage applications.

Optionally there are other measures to reduce intensity modulations in the backlight, such as backlight stripes that run in a checkerboard pattern (to hide the black matrix), in combination with a holographic diffuser that diffuses strongly orthogonal to the lens direction to hide the backlight structure. Optionally, multiple diffusers may be combined in a single (holographic) diffuser.

The detailed example and simulations above apply to one specific intended application (a 122 cm TV display). The specific design values are purely by way of example, and these details have been presented simply to enable the design issues to be understood. The concepts can then be applied to other designs.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

Any reference signs in the claims should not be construed as limiting the scope.

The invention claimed is:

1. A device, comprising:
a steerable display backlight, wherein the steerable display backlight comprises:
a light output arrangement; and
a first lenticular lens array,
wherein the first lenticular lens array is configured to receive light from the light output arrangement, and
wherein the first lenticular lens array is arranged to output a non-collimated directional light;
a display panel,
wherein the display panel is configured to be illuminated by the non-collimated directional light output by the first lenticular array, and
wherein the display panel has an array of sub-pixels, wherein the array of sub-pixels is arranged to produce an image in response to the non-collimated directional light;
a second lenticular lens array, wherein the second lenticular lens array is arranged to generate at least two views in different viewing directions from the image produced by the display panel;
a head tracking system, wherein the head tracking system is arranged to track one or more viewers each having two eyes; and
a controller circuit,
wherein the controller circuit is arranged to control the device to provide the two views to the two eyes of a tracked viewer at the same time, and
wherein the controller circuit is further arranged such that, in a situation where the head tracking system tracks two tracked viewers, the controller circuit steers the steerable display backlight to provide a first pair of the at least two views to the two eyes of a first tracked viewer in a first sub-frame and to provide no views to the two eyes of a second tracked viewer in the first sub-frame, and to provide no views to the two eyes of the first tracked viewer in a second sub-frame subsequent to the first sub-frame and to provide a second pair of the at least two views to the two eyes of the second tracked viewer in the second sub-frame.

2. The device of claim 1,
wherein the second lenticular lens array is arranged to provide at least four views,
wherein the controller circuit is arranged to provide the two views to the two eyes of the tracked viewer by assigning at least two input views per sub-pixel according to an amount by which the second lenticular lens array projects an output from each sub-pixel to estimated locations of a left eye and a right eye of the tracked viewer.

3. The device of claim 1,
wherein the second lenticular lens array is arranged to provide more than ten views,
wherein the controller circuit is arranged to provide the two views to the two eyes of the tracked viewer by assigning at least two input views per sub-pixel according to an amount by which the second lenticular lens array projects an output from each sub-pixel to estimated locations of a left eye and a right eye of the tracked viewer.

4. The device of claim 1, further comprising a shifting arrangement,
wherein the shifting arrangement is arranged to shift the second lenticular lens array relative to the display panel, and
wherein the controller circuit is arranged to control the shifting of the second lenticular lens array relative to the display panel.

5. The device of claim 1,
wherein the non-collimated directional light has an angular spread of less than $\tan^{-1}(5*IOD/vd)$,
wherein IOD is a mean inter-ocular distance for the general populace, and
wherein vd is one third of a height of the display panel.

6. The device of claim 5, wherein the angular spread is between $\tan^{-1}(1.5*IOD/vd)$ and $\tan^{-1}(3*IOD/vd)$.

7. The device of claim 1, wherein the head tracking system is arranged to locate a distance from the display panel to the tracked viewer, and to locate a lateral position of the tracked viewer, with respect to the display panel.

8. The device of claim 1, comprising a diffuser on one side of the display panel.

9. A method, comprising:
tracking one or more viewers;
selecting at least one selected line of light from a light output arrangement,
wherein the light output arrangement is arranged to selectively produce a plurality of lines of light,
wherein the at least one selected line of light is selected dependent on one or more corresponding locations of the tracked one or more viewers;
passing the at least one line of light through a first lenticular lens array,
wherein the first lenticular array is arranged to generate a non-collimated directional light output,
wherein the at least one line of light is selected so as to provide directional control of the non-collimated directional light, and;
illuminating a display panel with the non-collimated directional light output from the first lenticular lens array to produce an image, wherein the display panel comprises an array of sub-pixels;
a second lenticular lens array generating two views of the image in two corresponding different viewing directions and providing the two views to two corresponding eyes of a tracked viewer at the same time; and
in a situation where there are two tracked viewers, providing a first pair of views to the two eyes of a first tracked viewer in a first sub-frame and providing no views to the two eyes of a second tracked viewer in the first sub-frame, and providing no views to the two eyes of the first tracked viewer in a second sub-frame subsequent to the first sub-frame and providing a second pair of views to the two eyes of the second tracked viewer in the second sub-frame.

10. The method of claim 9, further comprising assigning at least two input views per sub-pixel according to an amount by which the second lenticular lens array projects an output from each sub-pixel to estimated locations of a left eye and a right eye of the tracked viewer, wherein the generating comprises generating at least four views.

11. The method of claim 9, further comprising assigning at least two input views per sub-pixel according to an amount by which the second lenticular lens array projects an output from each sub-pixel to estimated locations of a left eye and a right eye of the tracked viewer, wherein the generating comprises generating less than 10 views.

12. The method of claim 9, further comprising shifting the second lenticular lens array relative to the display panel.

13. The method of claim 9, wherein the non-collimated directional light has an angular spread of less than $\tan^{-1}(5*IOD/vd)$,
   wherein IOD is a mean inter-ocular distance for the general populace,
   wherein vd is one third of a height of the display panel.

14. The method of claim 9, further comprising:
   locating a distance to the tracked viewer with respect to the display panel; and
   locating a lateral position of the tracked viewer with respect to the display panel.

15. A device, comprising:
   a steerable display backlight, wherein the steerable display backlight comprises:
      a light output arrangement; and
      a first lenticular lens array, wherein the first lenticular lens array is configured to receive light from the light output arrangement;
   a display panel,
      wherein the display panel is configured to be illuminated by directional light output by the first lenticular array, and
      wherein the display panel has an array of sub-pixels, wherein the array of sub-pixels is arranged to produce an image in response to the directional light;
   a second lenticular lens array, wherein the second lenticular lens array is arranged to generate at least two views in different viewing directions from the image produced by the display panel;
   an eye tracking system, wherein the eye tracking system is arranged to track eyes of one or more viewers; and
   a controller circuit,
   wherein the controller circuit is arranged to control the device to provide the two views to two tracked eyes of a viewer at the same time, and
   wherein the controller circuit is further arranged such that, in a situation where the eye tracking system tracks the eyes of two viewers, the controller unit controls the steerable display backlight to provide a non-collimated directional light output to the display panel to cause the display panel to produce a first pair of views to two tracked eyes of a first viewer in a first sub-frame and to provide no views to two tracked eyes of a second viewer in the first sub-frame, and to provide no views to the two tracked eyes of the first viewer in a second sub-frame subsequent to the first sub-frame and to provide a second pair of views to the two tracked eyes of the second viewer in the second sub-frame.

16. The device of claim 15,
   wherein the second lenticular lens array is arranged to provide at least four views,
   wherein the controller circuit is arranged to provide the two views to the two eyes of the tracked viewer by assigning at least two input views per sub-pixel according to an amount by which the second lenticular lens array projects an output from each sub-pixel to estimated locations of a left eye and a right eye of the tracked viewer.

17. The device of claim 15,
   wherein the second lenticular lens array is arranged to provide more than ten-fractional views,
   wherein the controller circuit is arranged to provide the two views to the two eyes of the tracked viewer by assigning at least two input views per sub-pixel according to an amount by which the second lenticular lens array projects an output from each sub-pixel to estimated locations of a left eye and a right eye of the tracked viewer.

18. The device of claim 15, further comprising a shifting arrangement,
   wherein the shifting arrangement is arranged to shift the second lenticular lens array relative to the display panel, and
   wherein the controller circuit is arranged to control the shifting of the second lenticular lens array relative to the display panel.

19. The device of claim 15,
   wherein the non-collimated directional light has an angular spread of less than $\tan^{-1}(5*IOD/vd)$,
   wherein IOD is a mean inter-ocular distance for the general populace, and
   wherein vd is one third of a height of the display panel.

20. The device of claim 15, comprising a diffuser on one side of the display panel.

* * * * *